US011315092B1

(12) United States Patent
Dennis et al.

(10) Patent No.: US 11,315,092 B1
(45) Date of Patent: Apr. 26, 2022

(54) ATM-BASED ELECTRONIC PAYMENT FUNDING SYSTEMS, METHODS, AND INTERFACES

(71) Applicant: PNC Global Transfers, Inc., Houston, TX (US)

(72) Inventors: Mark Dennis, Houston, TX (US); Miguel Angel Macias, Houston, TX (US); Jaime Caballero, Houston, TX (US)

(73) Assignee: PNC Global Transfers, Inc., Houston, TX (US)

( * ) Notice: Subject to any disclaimer, the term of this patent is extended or adjusted under 35 U.S.C. 154(b) by 0 days.

(21) Appl. No.: 16/237,343

(22) Filed: Dec. 31, 2018

(51) Int. Cl.

| | |
|---|---|
| ***G06Q 20/10*** | (2012.01) |
| ***G06Q 20/22*** | (2012.01) |
| ***G06Q 20/40*** | (2012.01) |
| ***G06Q 20/32*** | (2012.01) |

(52) U.S. Cl.
CPC ....... *G06Q 20/1085* (2013.01); *G06Q 20/227* (2013.01); *G06Q 20/3221* (2013.01); *G06Q 20/4012* (2013.01)

(58) Field of Classification Search
CPC .................................................. G06Q 20/1085
See application file for complete search history.

(56) References Cited

U.S. PATENT DOCUMENTS 9,311,632 B1 * 4/2016 Dent .................. G06Q 20/3224
9,626,664 B2 * 4/2017 Bouey .................. G06Q 20/405
2005/0035193 A1 * 2/2005 Gustin .................. G06Q 20/10 235/379
2009/0265273 A1 * 10/2009 Guntupalli ............. G06Q 20/18 705/44
2012/0047070 A1 * 2/2012 Pharris .................. H04M 17/20 705/43

(Continued)

FOREIGN PATENT DOCUMENTS

CA 2765806 A1 * 7/2012 ............. G07F 19/20

OTHER PUBLICATIONS

"Bansal and Singla, Cash Withdrawal from ATM machine using Mobile Banking, Jul. 18, 2016, IEEE, entire document" (Year: 2016).*

*Primary Examiner* — Hani M Kazimi
*Assistant Examiner* — Adam Hilmantel
(74) *Attorney, Agent, or Firm* — ALG Intellectual Property, LLC

(57) ABSTRACT

An exemplary system includes at least one physical computing device that is communicatively coupled, by way of a network, to an automated teller machine (ATM), and that receives a transaction identifier from the ATM, uses the transaction identifier to query an electronic payment system, receives, from the electronic payment system in response to the query, data representative of a pending electronic payment that is associated with the transaction identifier and is awaiting funding, sends data representative of information about the pending electronic payment to the ATM, the information indicating an amount to fund the pending electronic payment, receives, from the ATM, a confirmation that the ATM has received the amount to fund the pending electronic payment, and notifies the electronic payment system that the pending electronic payment has been funded.

20 Claims, 16 Drawing Sheets

106
700
Pending Payment: abcde0001
Sender Name: John Doe
Recipient Name: Jane Doe
Amount: $100.00
Service Fee: $5.00
Total Funding Amount: $105.00
Insert $105.00 cash to fund payment
Cancel
Back

(56) References Cited

U.S. PATENT DOCUMENTS

2013/0005253 A1* 1/2013 Grigg ................. G06Q 20/1085
455/41.1
2013/0006810 A1* 1/2013 Elias ...................... G06Q 40/00
705/26.41
2016/0012399 A1* 1/2016 Etchegoyen ....... G06Q 20/3829
705/76

* cited by examiner

ATM-BASED ELECTRONIC PAYMENT FUNDING SYSTEMS, METHODS, AND INTERFACES

BACKGROUND INFORMATION

An automated teller machine (ATM) is a computer-implemented banking outlet that allows bank customers with bank accounts to complete basic transactions without the aid of a bank representative. Typically, a bank customer uses a bank-issued credit or debit card to authenticate to and use an ATM to deposit money into or withdraw money from the bank customer's bank account. A conventional ATM provides a limited set of basic transactions accessible only to bank customers who have bank accounts that can be used for the basic transactions. Technical solutions are desired that provide additional options through an ATM.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
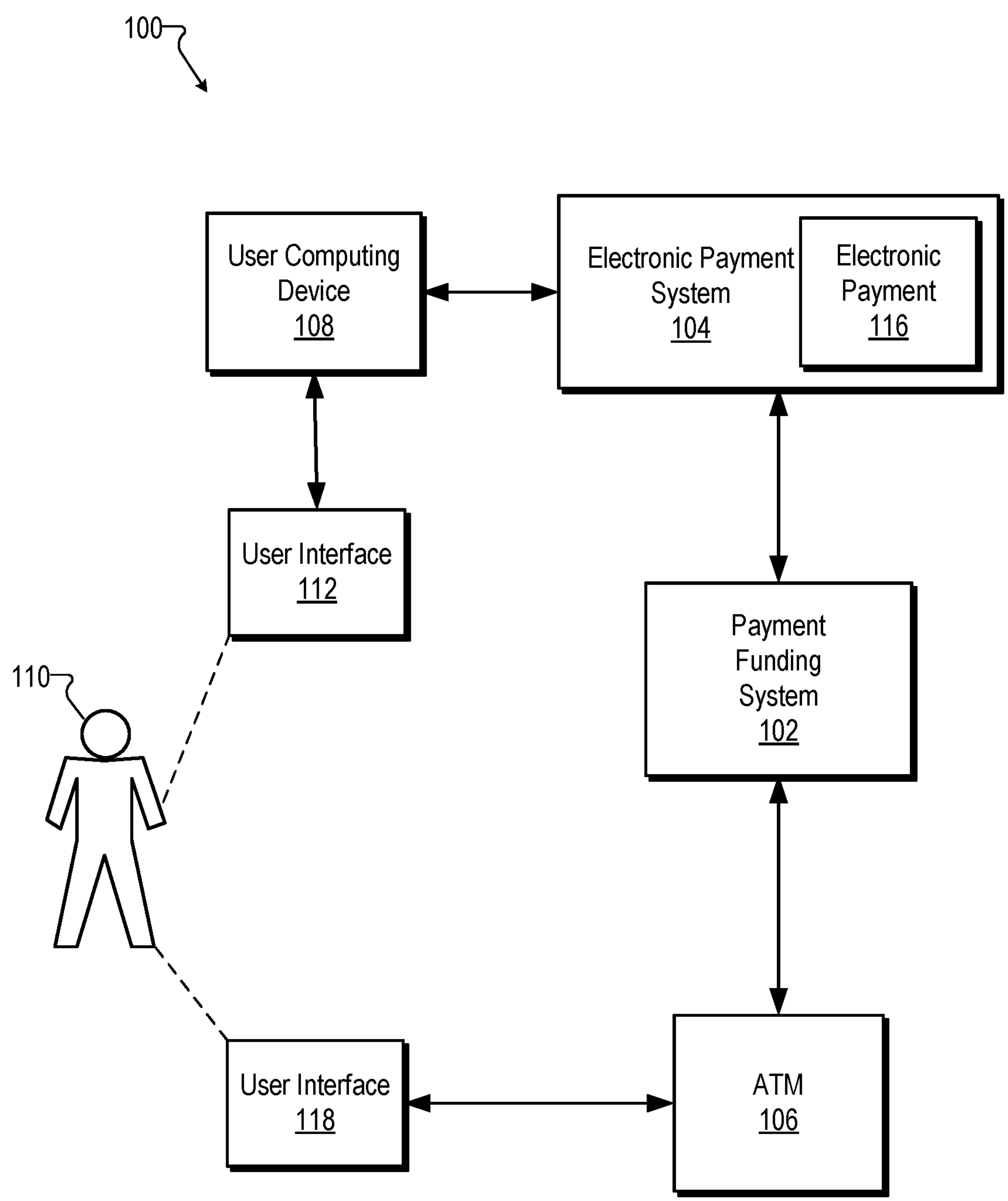
FIG. 1 illustrates an exemplary configuration in which an ATM-based electronic payment funding system is implemented according to principles described herein.

ATM-based electronic payment funding systems, methods, and interfaces are described herein. As will be described in more detail below, ATM-based electronic payment funding systems, methods, and interfaces described herein facilitate funding, by way of an ATM, an electronic payment pending in an electronic payment system. To this end, for example, ATM-based electronic payment funding systems, methods, and interfaces described herein may provide an interface between an ATM and an electronic payment system, which interface is configured to support ATM-based funding of an electronic payment pending in the electronic payment system. Additionally, ATM-based electronic payment funding systems, methods, and interfaces described herein may provide one or more user interfaces for use by a person to fund a pending electronic payment by way of an ATM.

In certain embodiments, an electronic payment system (e.g., a bank wire service) may generate data representative of a pending electronic payment created by a person (a "sender") wanting to send a payment by way of the electronic payment system. Through a user interface, the electronic payment system may provide an option selectable by the sender to choose to fund the pending electronic payment by way of an ATM. The electronic payment system may also provide information to facilitate funding of the pending electronic payment by way of an ATM, such as a transaction identifier for the pending electronic payment and, in some examples, information about participating ATMs.

The sender may then visit and interact with an appropriately configured ATM to fund the electronic payment that is pending in the electronic payment system. To facilitate such interaction, the ATM may present a menu of options each selectable by the sender to access a respective feature of the ATM. The menu of options may include an option for funding one or more pending electronic payments at the ATM. The ATM may detect a user selection of the option for funding one or more pending electronic payments at the ATM and, in response, may prompt for user input of one or more transaction identifiers for the one or more pending electronic payments. The sender may input, to the ATM, the transaction identifier received from the electronic payment system. The ATM may receive the user input indicating the transaction identifier and provide the transaction identifier to a payment funding system that is communicatively coupled to the ATM.

The payment funding system may receive, from the ATM, data representative of the transaction identifier. The payment funding system may use the transaction identifier to query the electronic payment system, and receive, from the electronic payment system in response to the query, data representative of the pending electronic payment associated with the transaction identifier. The payment funding system may send, to the ATM, data representative of information about the identified pending electronic payment, such as information indicating an amount to fund the pending electronic payment.

The ATM may receive and present the information about the pending electronic payment to the sender. The ATM may prompt the sender to provide the amount to fund the electronic pending payment. In certain examples, the prompt may include a menu of options each selectable by the sender to indicate how the sender will provide the amount to fund the pending electronic payment at the ATM (e.g., options to provide funds by way of a debit card, a credit card, physical currency, and/or another payment platform). In such examples, in response to a user selection of one of the options, the ATM may prompt the sender to provide the funds using the selected payment platform. For example, the ATM may prompt the sender to insert physical currency to fund the pending electronic payment. The ATM may receive the amount to fund the pending electronic payment and may send, to the payment funding system, a confirmation indicating that the amount to fund the pending electronic payment has been received by the ATM.

The payment funding system may receive, from the ATM, the confirmation that the ATM has received the amount to fund the pending electronic payment and may notify the electronic payment system that the pending electronic payment has been funded. Based on this notification, the electronic payment system may process the pending electronic payment, including by releasing the funds for payment to a designated recipient of the electronic payment.

By facilitating funding of pending electronic payments at an ATM in this or a similar manner, ATM-based electronic payment funding systems, methods, and interfaces described herein may facilitate efficient, automated, and/or secure funding of pending electronic payments at an ATM, including funding of pending electronic payments such as bank wires with physical currency. In certain examples, ATM-based electronic payment funding systems, methods, and interfaces described herein may facilitate funding of a pending electronic payment with physical currency without requiring use of a bank account of the payment sender and/or without requiring the payment sender to register with or provide sensitive information to an electronic payment service that processes the electronic payment. This is in contrast to conventional electronic payment systems in which options for funding an electronic payment are limited. For example, certain conventional electronic payment systems are limited to electronically receiving, within the same user interface in which electronic payments are created (e.g., within the same mobile application or website provided by the electronic payment system), virtual funds from a bank account of the sender (e.g., directly from the bank account or using a bank credit or debit card linked to the bank account) that has been linked to the electronic payment system. Such conventional options often require a payment sender to provide, and the electronic payment system to safeguard, sensitive information such as sender banking information, debit card information, etc. As another example, certain conventional electronic payment systems require a sender of an electronic payment to interact with a human representative at a brick and mortar location to fund an electronic payment. Such conventional options require the sender to work around the schedule of a human representative during hours that the brick and mortar location is open for business, which may be inconvenient.

Accordingly, ATM-based electronic payment funding systems, methods, and interfaces described herein may improve and/or enhance electronic payment systems, such as by expanding the usability and/or the accessibility of conventional electronic payment systems. Additionally or alternatively, ATM-based electronic payment funding systems, methods, and interfaces described herein may improve and/or enhance ATMs, such as by expanding the features and/or services of conventional ATMs (e.g., by facilitating use of an ATM to fund a pending electronic payment that is awaiting funding). In this or a similar manner, ATM-based electronic payment funding systems, methods, and interfaces described herein provide a technical solution to one or more technical problems of conventional electronic payment systems and/or ATMs and/or improve operations of electronic payment systems and/or ATMs.

These and/or other benefits and/or advantages that may be provided by the systems, methods, and interfaces described herein will be made apparent by the following detailed description.

FIG. 1 illustrates an exemplary configuration 100 in which an ATM-based electronic payment funding system is implemented. As shown, configuration 100 includes a payment funding system 102 communicatively coupled to an electronic payment system 104 and an ATM 106. Payment funding system 102 may be configured to communicate with electronic payment system 104 and ATM 106 using any suitable communication technologies, including network communication technologies and/or any suitable interfaces, such as one or more of the interfaces described herein. While payment funding system 102 is shown to be separate from and communicatively coupled to electronic payment system 104 and ATM 106 in FIG. 1, one or more components of payment funding system 102 may be integrated within electronic payment system 104 and/or ATM 106 in other configurations.

As further shown in FIG. 1, electronic payment system 104 may be communicatively coupled to a user computing device 108. Electronic payment system 104 and user computing device 108 may be configured to communicate one with another using any suitable communication technologies, including network communication technologies.

User computing device 108 may include any computing device associated with (e.g., operated by) a user 110 (e.g., a user of user computing device 108 and/or electronic payment system 104) and configured to communicate with electronic payment system 104. For example, user computing device 108 may include a mobile device (e.g., a tablet computer, a smartphone device, a cell phone device, etc.) or other suitable computing device configured to be used by user 110 to access one or more services provided by electronic payment system 104.

Electronic payment system 104 and/or user computing device 108 may be configured to provide a user interface 112 through which user 110 may interact with electronic payment system 104 by way of user computing device 108. User interface 112 may include any suitable interface, such as a graphical user interface, a voice-recognition user interface, etc. through which user 110 may interact with electronic payment system 104. In certain examples, user interface 112 may include an application user interface provided by an application (e.g., a mobile application) installed and executing on user computing device 108. In certain other examples, user interface 116 may include a web interface (e.g., a website) provided by electronic payment system 104 and accessed by user computing device 108. Examples of graphical user interface views that may be provided to user 110 by way of user interface 112 are described herein.

Electronic payment system 104 may include one or more physical computing devices (e.g., servers, data stores, etc.) configured to perform the operations of electronic payment system 104 described herein. Electronic payment system 104 may be configured to process electronic payments by transferring electronically-represented virtual funds from payment senders to payment recipients. An electronic payment may include any form of an electronically-processed payment of an amount, i.e., a transfer of electronically-represented virtual funds, from a payment sender to a payment recipient. For example, an electronic payment may include a payment made through an online payment service, a money wire, a mobile wallet payment, or any other form of electronic payment. Virtual funds may include any electronic representation of money maintained by electronic payment system 104.

Electronic payment system 104 may facilitate user 110 initiating an electronic payment to a designated recipient. For example, through user interface 112, electronic payment system 104 may provide one or more tools for use by user 110 to create an electronic payment addressed to the recipient. User 110 may use the tools to provide input defining an electronic payment to be made to the recipient. For example, user 110 may specify that user 110 is the sender of the payment, that the recipient is the designated beneficiary of the payment, an amount to be paid to the recipient, and/or any other information about the electronic payment to be made from the sender to the recipient.

A payment sender may be any person or other entity (e.g., a business entity, a bank account, etc.) that is designated a sender of an electronic payment. A payment recipient may be any person or other entity (e.g., a business entity, a bank account, etc.) that is designated a recipient of an electronic payment.

Electronic payment system 104 may receive the information for the new electronic payment and may generate data representative of the new electronic payment in electronic payment system 104. For example, electronic payment system 104 may generate and store a data record that includes information representative of the new electronic payment. Electronic payment 116 shown in FIG. 1 represents such a record generated and stored by electronic payment system 104.

Electronic payment system 104 may store the electronic payment 116 in any suitable way and using any suitable data storage technologies. For example, electronic payment system 104 may store a data record representing the electronic payment in a data store such as a database that is included in or communicatively coupled to electronic payment system 104 (e.g., in a data center included in or communicatively coupled to electronic payment system 104).

Electronic payment system 104 may generate and assign a unique transaction identifier to an electronic payment. The transaction identifier may be in any suitable form (e.g., any suitable number of letters, numbers, and/or other characters) and may be configured for use to identify the electronic payment in the data store. For example, electronic payment system 104 may be configured to use the transaction identifier to query the data store and retrieve data representative of the electronic payment.

Electronic payment system 104 may designate a status of an electronic payment. For example, electronic payment 116 that has been created and stored but has not yet been funded may be designated to have a "pending" or "awaiting funding" status and may be referred to as a pending electronic payment or an electronic payment that is awaiting funding. Electronic payment system 104 may be configured to update the status of electronic payment 116 in response to certain events, such as by updating the status of electronic payment 116 to "funded" when funding of electronic payment 116 has been confirmed.

In certain examples, electronic payment system 104 may provide one or more options for funding an electronic payment. Electronic payment system 104 may present the funding options to user 110 in any suitable way and/or at any suitable time. For example, in association with user 110 creating an electronic payment, electronic payment system 104 may provide funding options to user 110 by way of user interface 112. User 110 may select one or more of the funding options to indicate how user 110 would like to fund the electronic payment. Examples of funding options that may be provided by electronic payment system 104 may include options to fund, through user interface 112, the electronic payment by way of a bank account of user 110 that is linked to electronic payment system 104, a credit or debit card of user 110, and/or another suitable payment platform. Additionally or alternatively, electronic payment system 104 may provide an option to fund the electronic payment by way of an ATM (e.g., instead of through user interface 112). Examples of funding an electronic payment by way of an ATM are described herein.

Electronic payment system 104 may be configured to provide information about a created electronic payment to user 110. For example, electronic payment system 104 may provide information about the electronic payment, such as the transaction identifier for the electronic payment and/or other information about the electronic payment, for presentation in user interface 112.

Figure 2:
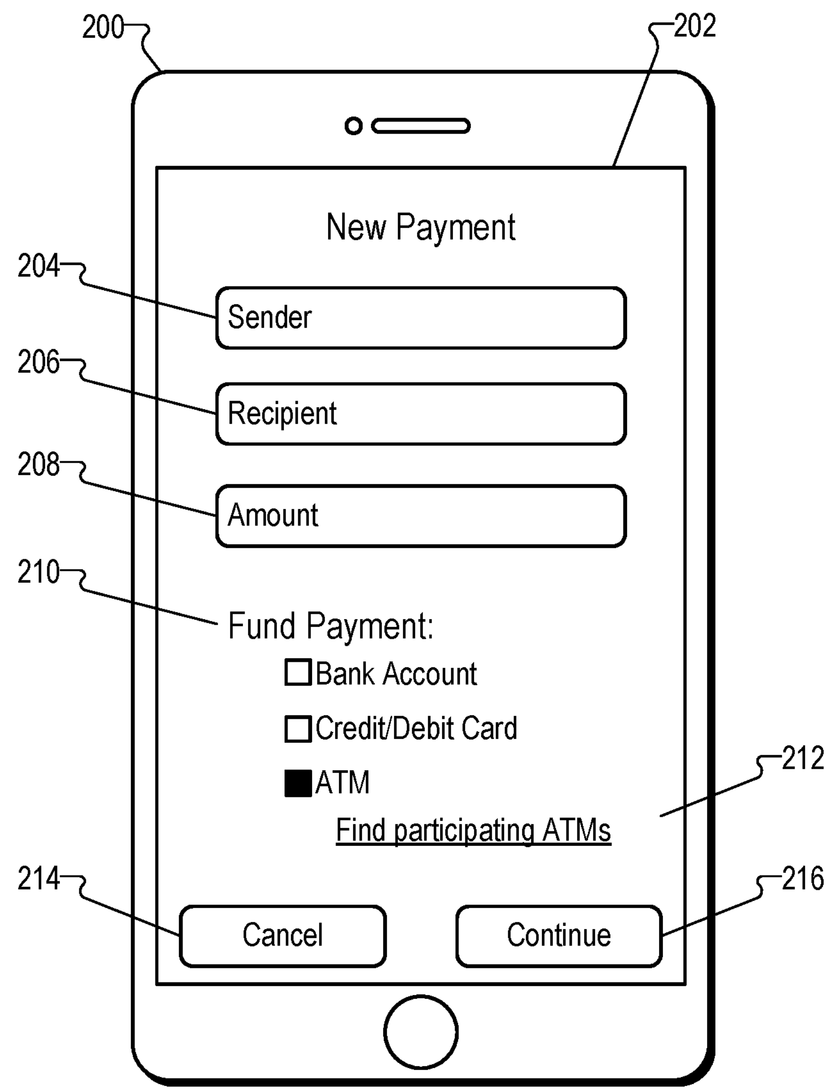
FIGS. 2-3 illustrate exemplary graphical user interface views displayed by a mobile computing device according to principles described herein.
Figure 3:
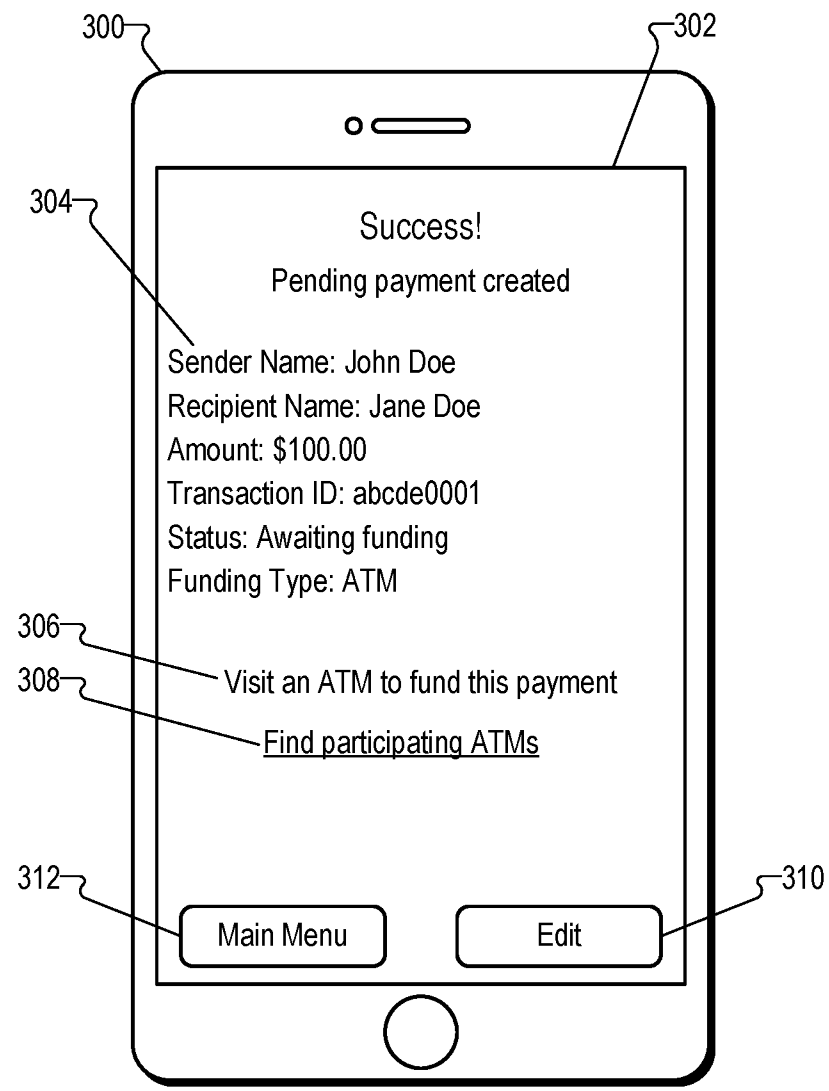

FIGS. 2-3 illustrate exemplary graphical user interface views that may be presented to user 110 by way of user interface 112 in association with user 110 interacting with electronic payment system 104 to create a new electronic payment. The illustrated graphical user interface views are illustrative. Additional and/or alternative user interface features and/or content may be provided through user interface 112 in other examples.

FIG. 2 illustrates a user computing device in the form of a mobile computing device 200 displaying an exemplary graphical user interface view 202. Graphical user interface view 202 may include tools for use by user 110 to create a new electronic payment. For example, graphical user interface view 202 may include a sender field 204 for input of payment sender information, a recipient field 206 for input of payment recipient information, and an amount field 208 for input of a payment amount. Graphical user interface view 202 may further include a menu of funding options configured to be selected by user 110 to indicate how the new electronic payment will be funded. In the illustrated example, the menu of funding options includes options to fund the electronic payment with a bank account linked to electronic payment system 104, with a credit or debit card, and by way of an ATM. As shown, graphical user interface view 202 may further include a link 212 selectable by user 110 to access information about participating ATMs at which user 110 may fund the electronic payment. A user selection of link 212 may trigger a display of information about such ATMs, such as a list or map view that indicates participating ATMs. Graphical user interface view 202 may further include a cancel option 214 selectable by user 110 to cancel the creation of the electronic payment and a continue option 216 selectable by user 110 to create or continue with the creation of the electronic payment.

In response to creation of the electronic payment, user interface 112 may provide graphical user interface view 302 for display as shown in FIG. 3. Graphical user interface view 302 may include content indicating that the electronic payment has been successfully created. Graphical user interface view 302 may further include information 304 about the created electronic payment (e.g., summary information for the electronic payment). As shown, for example, information 304 may indicate a payment sender, a payment recipient, an amount of the payment, a transaction identifier, a status, and a funding type for the electronic payment. In the illustrated example, information 304 indicates that the electronic payment is awaiting funding and that an ATM-based transaction is the selected payment platform for funding the electronic payment.

As shown, graphical user interface view 302 may further include an instruction 306 to visit an ATM to fund the electronic payment and a link 308 selectable by user 110 to access information about participating ATMs at which user 110 may fund the electronic payment. A user selection of link 308 may trigger a display of information about such ATMs, such as a list or map view that indicates participating ATMs.

Graphical user interface view 302 may further include an edit option 310 selectable by user to edit the electronic payment, such as by changing the selected funding platform, for example. Graphical user interface view 302 may further include a main menu option 312 selectable by user 110 to access a main menu screen of user interface 112.

While graphical user interface view 302 includes a menu of funding options for use by user 110 to indicate how user 100 will fund the electronic payment, this is illustrative. Such a menu of funding options may be omitted from graphical user interface view 302 and/or displayed in a different view of user interface 112 in other examples.

After user 110 has created the electronic payment with electronic payment system 104, user 110 may visit and interact with a participating ATM to fund the electronic payment. Referring again to FIG. 1, for example, user 110 may visit ATM 106 and interact with ATM 106 by way of a user interface 118 provided by ATM 106.

ATM 106 may include a physical computing device configured to perform the operations of ATM 106 described herein. ATM 106 is configured to communicate with electronic payment system 104 by way of payment funding system 102 and to provide user interface 118 by way of which user 110 may interact with ATM 106 to fund the electronic payment. Through ATM 106, user 110 may fund the electronic payment using any suitable payment platform that is supported by ATM 106. For example, ATM 106 may be configured to accept funds for the electronic payment by way of a bank account, a credit or debit card, physical currency (e.g., cash and/or coin), and/or any other payment platform supported by ATM 106. To this end, ATM 106 may be configured to physically accept a credit or debit card and/or physical currency. ATM 106 may be included in a network, system, or alliance of ATMs. In certain examples, ATM 106 may be included in a group of participating ATMs that are communicatively coupled to electronic payment system 104 by way of payment funding system 102 and are configured to accept funds for pending electronic payments stored by electronic payment system 104.

Payment funding system 102 may include one or more physical computing devices (e.g., servers, data stores, etc.) configured to perform the operations of payment funding system 102 described herein. Payment funding system 102 is configured to facilitate funding, by way of ATM 106, of an electronic payment pending with electronic payment system 104. For example, payment funding system 102 may perform operations to facilitate funding of an electronic payment with physical currency that is received by way of ATM 106. Examples of such operations, which include operations in which payment funding system 102 communicates with ATM 106 and/or electronic payment system 104, are described in detail herein.

As mentioned, after user 110 has created an electronic payment that is pending with electronic payment system 104, user 110 may visit ATM 106 and interact with ATM 106 to fund the electronic payment by way of ATM 106. For example, through user interface 118, ATM 106 may provide one or more tools for use by user 110 to provide funding for the pending electronic payment. User 110 may use the tools to interact with ATM 106 to identify and provide funding for the pending electronic payment.

To illustrate, through user interface 118, user 110 may provide and ATM 106 may receive user input selecting an ATM service option to fund a pending electronic payment. In response, ATM 106 may prompt user 110 to enter a transaction identifier for the electronic payment. Through user interface 118, user 110 may provide and ATM 106 may receive user input indicating the transaction identifier for the electronic payment. ATM 106 may be configured to receive input representative of the transaction identifier in any suitable way, such as by receiving character input entered by user 110 (e.g., by way of a keypad of ATM 106), image input captured by ATM 106 (e.g., a QR code or other visual input captured by a scanner, camera, or other device implemented by and/or communicatively coupled to ATM 106), audio input captured by ATM 106 (e.g., a voice command provided by user 110 and captured by a microphone implemented by and/or communicatively coupled to ATM 106), and/or any other suitable input that may be provided to ATM 106 by user 110.

ATM 106 may communicate the received transaction identifier to payment funding system 102 and initiate a query of electronic payment system 104 for an electronic payment assigned the transaction identifier. Payment funding system 102 may communicate with electronic payment system 104 to use the transaction identifier to query electronic payment system 104. Through the query, electronic payment system 104 may identify the electronic payment corresponding to the transaction identifier and may provide information about the electronic payment to payment funding system 102, which may then provide the information about the electronic payment to ATM 106.

ATM 106 may receive the information about the electronic payment from payment funding system 102 and may present any of the information about the electronic payment to user 110 by way of user interface 118. For example, ATM 106 may display payment sender information, payment recipient information, an amount of the payment (also referred to as the "transaction amount"), an amount of a service fee to process the payment, and/or a total funding amount that should be provided to fully fund the payment. In certain examples, through user interface 118, ATM 106 may prompt user 110 to provide the funding amount by way of ATM 106.

ATM 106 may receive the funding amount from user 110 in any suitable way, such as through a credit or debit card payment authorized by user 110, from a bank account indicated by user 110, and/or as physical currency deposited by user 110 into ATM 106. In response to receiving the funding amount, ATM 106 may notify payment funding system 102 that ATM 106 has received the funding amount, such as by sending a confirmation of funding to payment funding system 102.

Payment funding system 102 may receive the confirmation of funding and notify electronic payment system 104 that the electronic payment has been funded. Electronic payment system 104 may receive the notification and respond by processing the electronic payment, including by releasing the funds to the designated payment recipient.

FIGS. 4-8 illustrate exemplary graphical user interface views that may be presented to user 110 by way of user interface 118 in association with user 110 interacting with ATM 106 to fund a pending electronic payment. The illustrated graphical user interface views are illustrative. Additional and/or alternative user interface features and/or content may be provided through user interface 118 in other examples.

Figure 4:
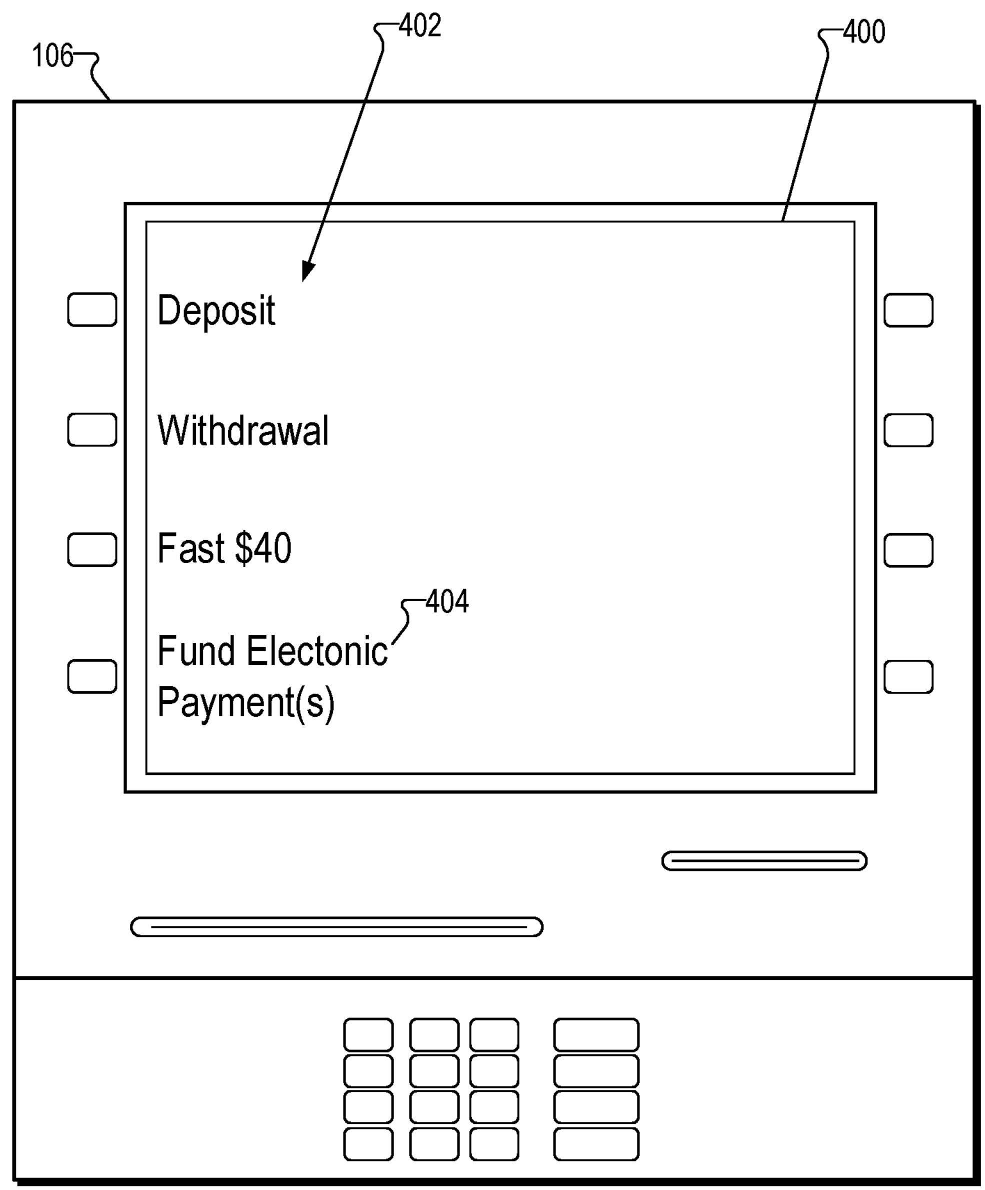
FIGS. 4-8 illustrate exemplary graphical user interface views displayed by an ATM according to principles described herein.

FIG. 4 illustrates ATM 106 displaying an exemplary graphical user interface view 400 that presents a menu 402 of options each selectable by user 100 to access a respective feature of ATM 106. As shown, the menu 402 of options may include an option 404 to fund one or more pending electronic payments at ATM 106.

Figure 5:
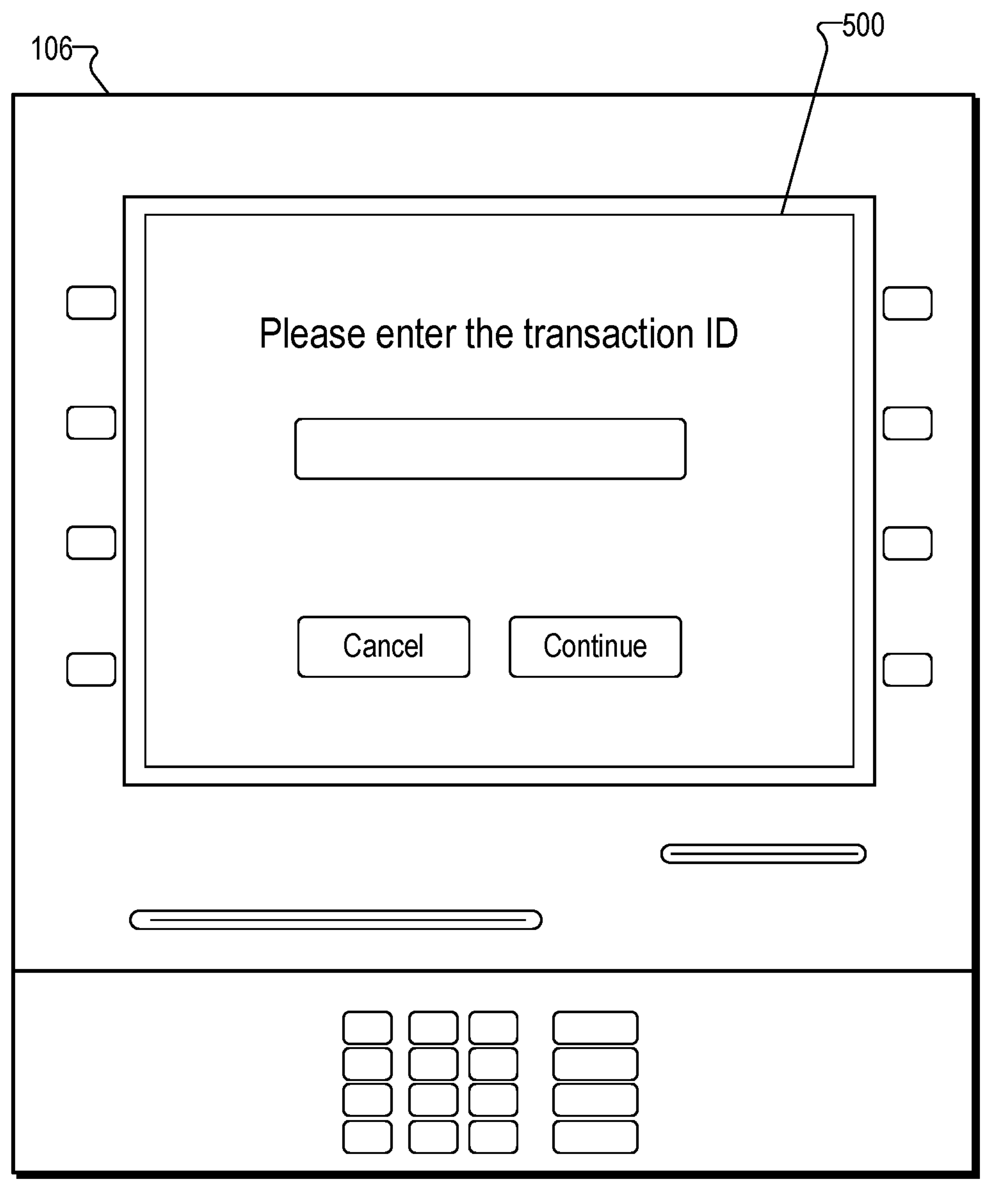

In response to a user selection of option 404, ATM 106 may display a graphical user interface view that prompts user 110 to input a transaction identifier for an electronic payment to be funded. FIG. 5 illustrates ATM 106 displaying an exemplary graphical user interface view 500 that prompts user 110 to input a transaction identifier for an electronic payment. User 110 may input the transaction identifier in any suitable way (e.g., by using a keypad, microphone, or other input mechanism of ATM 106 to provide user input representing the transaction identifier).

In response to user input of a transaction identifier, ATM 106 may communicate the transaction identifier to payment funding system 102, which may use the transaction identifier to query electronic payment system 104 for a corresponding electronic payment. If a matching electronic payment is found in electronic payment system 104, payment funding system 102 may receive information about the electronic payment from electronic payment system 104 and provide the information to ATM 106.

Figure 6:
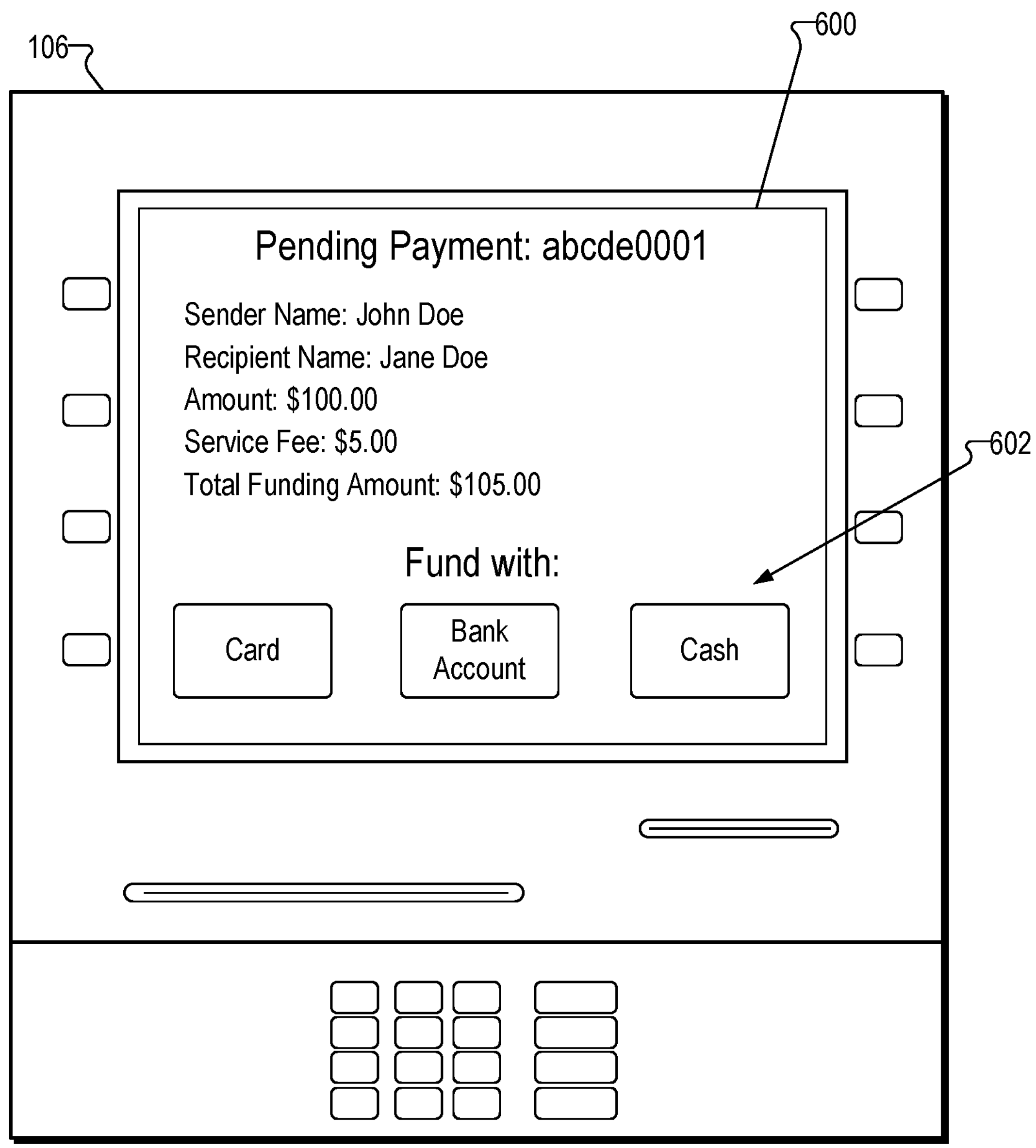

ATM 106 may present, to user 110 by way of user interface 118, information about the electronic payment that corresponds to the transaction identifier. FIG. 6 illustrates ATM 106 displaying an exemplary graphical user interface view 600 that presents information about the electronic payment that corresponds to the transaction identifier that was input into graphical user interface view 500 of FIG. 5. As shown, graphical user interface view 600 may include information indicating the transaction identifier, payment sender, payment recipient, payment amount, service fee, and total funding amount for the electronic payment.

As shown in FIG. 6, graphical user interface view 600 may further include a menu 602 of payment options each selectable by user 100 to indicate a payment method that user 110 will use to fund the electronic payment at ATM 106. As shown, the menu 602 of options may include options to fund the electronic payment with a card (e.g., a credit or debit card), a bank account, or physical currency (e.g., cash). User 110 may select one or more of the options to indicate how user 100 will fund the electronic payment at ATM 106.

Figure 7:
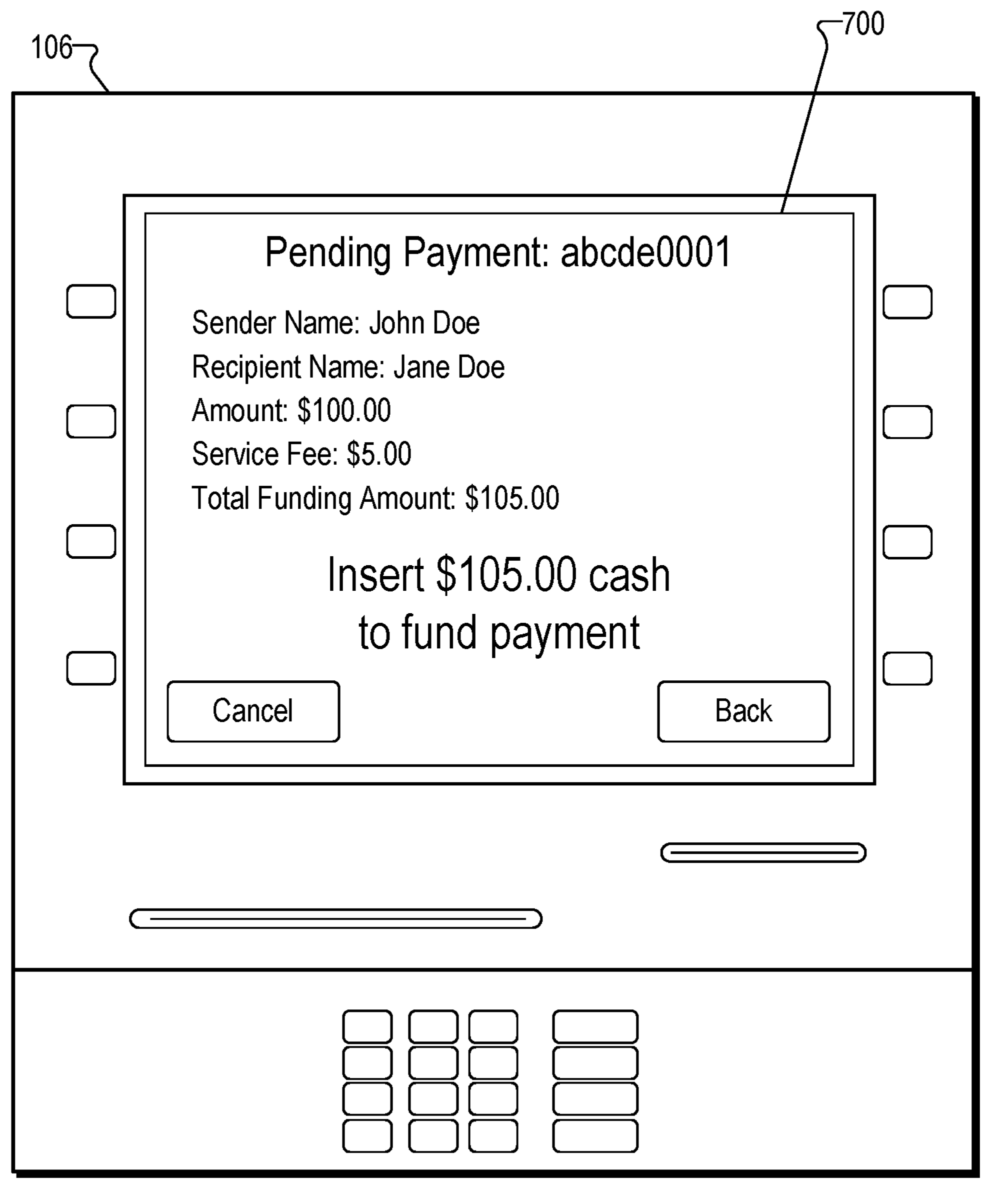

As an example, ATM 106 may detect a user selection of the option to fund the electronic payment with physical currency. In response, ATM 106 may prompt user 110 to insert physical currency to fund the electronic payment. FIG. 7 illustrates ATM 106 displaying an exemplary graphical user interface view 700 that prompts user 110 to insert physical currency to fund the electronic payment.

Figure 8:
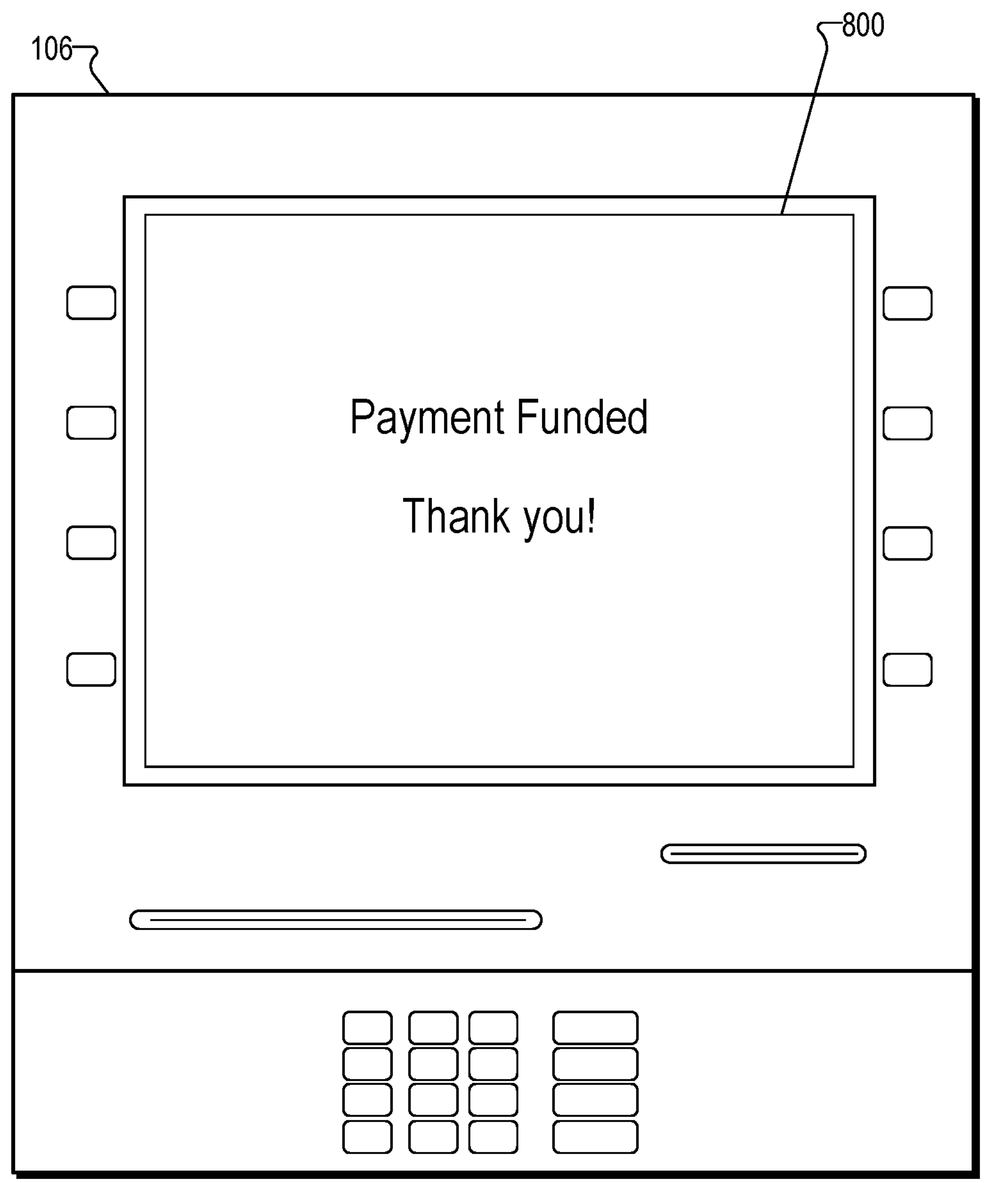

User 110 may deposit physical currency into ATM 106, and ATM 106 may receive and identify the physical currency as a payment to fund the electronic payment. ATM 106 may provide a confirmation of the funding to user 110. For example, FIG. 8 illustrates ATM 106 displaying an exemplary graphical user interface view 800 that confirms that the electronic payment has been funded.

As mentioned, payment funding system 102 may be configured to interface with ATM 106 and electronic payment system 104 and perform operations described herein to facilitate funding, by way of ATM 106, an electronic payment pending with electronic payment system 104. Payment funding system 102, electronic payment system 104, and ATM 106 may be configured to interface one with another in any suitable way and using any suitable communications and/or computer interfacing technologies. An exemplary configuration of interfaces that may be implemented by payment funding system 102, electronic payment system 104, and ATM 106 will now be described. The exemplary configuration is illustrative. Additional or alternative interfaces may be used in other configurations.

Figure 9:
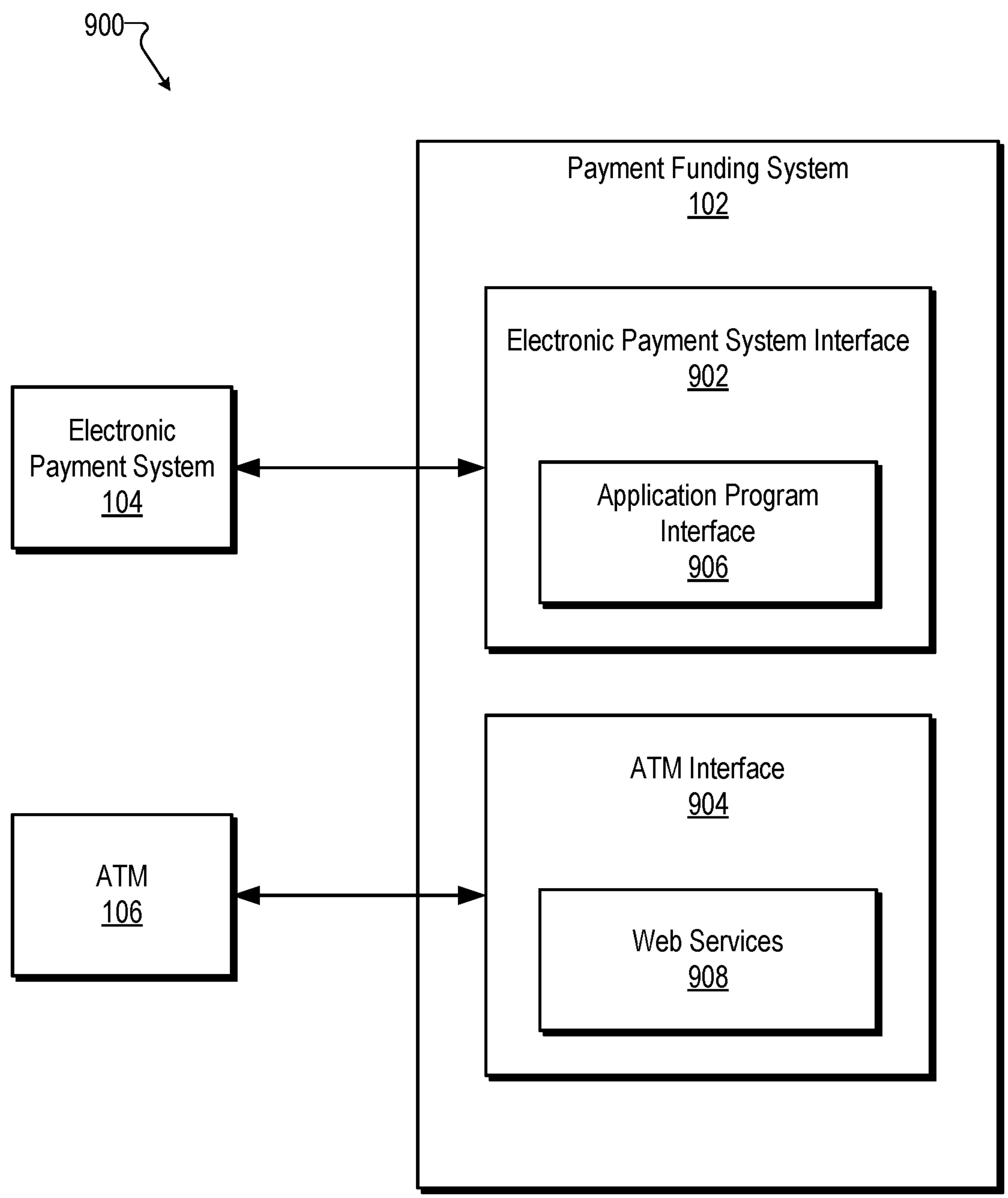
FIG. 9 illustrates an exemplary configuration of payment funding system interfaces with an electronic payment system and an ATM.

FIG. 9 illustrates an exemplary configuration 900 in which payment funding system 102 implements an electronic payment system interface 902 for interfacing with electronic payment system 104 and an ATM interface 904 for interfacing with ATM 106. Electronic payment system 104 and ATM 106 may be correspondingly configured for interfacing with payment funding system 102 by way of electronic payment system interface 902 and ATM interface 904, respectively.

Electronic payment system interface 902 may include an application program interface 906, which may include a set of one or more application program interfaces (APIs) configured to be called by payment funding system 102 to interface with electronic payment system 104. Payment funding system 102 may call an API included in the set of APIs in any suitable way. The called API may be executed to perform one or more operations on electronic payment system 104 and return results of the operations.

In certain examples, the set of APIs may include a transaction query API that is configured to request from electronic payment system 104 information for (e.g., a status of) an electronic payment associated with a transaction identifier. Payment funding system 102 may call the transaction query API and provide the transaction identifier to the transaction query API for use by the transaction query API to initiate and/or perform a search of a data store associated with electronic payment system 104 for a pending electronic payment associated with the transaction identifier. In some examples, payment funding system 102 may provide additional information to the transaction query API, such as an identifier for ATM 106.

Payment funding system 102 may call the transaction query API in any suitable way. For example, payment funding system 102 may generate and send, to the transaction query API and/or a host of the transaction query API, a transaction query request message that includes data representative of a transaction identifier and an ATM identifier.

The transaction query API may provide the results of the query. For example, the transaction query API may provide notification that no matching pending electronic payment is found in electronic payment system 104, or transaction query API may provide information for an identified pending electronic payment that is associated with the transaction identifier found in electronic payment system 104.

The transaction query API may provide the results in any suitable way. For example, the transaction query API may provide a transaction query response message that includes data representative of an operation code indicating an outcome of the query (e.g., an operation code indicating operation success, that a parameter is missing from the request message, that an invalid parameter is included in the request, that the electronic payment is not available for funding, that an error contacting electronic payment system 104 occurred, etc.), information about an identified pending electronic payment (e.g., a status of the electronic payment), a fee amount for processing the electronic payment, and/or any other information about the query and/or outcome of the query.

In certain examples, the set of APIs may include a funding outcome API that is configured to notify electronic payment system 104 of an outcome of a collection of funds at ATM 106 for an electronic payment associated with a transaction identifier. Payment funding system 102 may call the funding outcome API and provide the transaction identifier and/or information about the outcome of a collection of funds at ATM 106 for the electronic payment associated with the transaction identifier. In some examples, payment funding system 102 may provide additional information to the funding outcome API, such as an identifier for ATM 106, an ATM transaction identifier for an ATM transaction, a date/time of an ATM transaction, an ATM operation code indicating success, failure, or other outcome of an ATM transaction (e.g., an ATM operation code indicating a funds collection success, a user cancellation of funds collection, an error with funds collection, etc.), an ATM location identifier (e.g., a bank branch, store, and/or territory identifier), and/or any other information about a collection of funds at ATM 106.

Payment funding system 102 may call the funding outcome API in any suitable way. For example, payment funding system 102 may generate and send, to the funding outcome API and/or a host of the funding outcome API, a funding outcome request message that includes data representative of a transaction identifier and any of the additional information described above.

The funding outcome API may perform one or more operations in response to receiving the request message and may provide a response message that includes data representative of the performance of the operations. For example, the funding outcome API may provide information indicating success or failure in updating a status of an electronic payment in response to a funding outcome request message.

The funding outcome API may provide a response in any suitable way. For example, the funding outcome API may provide a funding outcome response message that includes data representative of an operation code indicating an outcome of the request message (e.g., an operation code indicating operation success, that a parameter is missing from the request message, that an invalid parameter is included in the request, that the electronic payment is not available for funding, that an error contacting electronic payment system 104 occurred, etc.) and/or any other information about the request message and/or an outcome of updating the electronic payment in view of the request message.

In examples in which the funding outcome API successfully updates the status of a pending electronic payment with electronic payment system 104 to indicate that the electronic payment has been funded, electronic payment system 104 may process the electronic payment based on the updated status. For example, electronic payment system 104 may release the funds for the electronic payment to the designated payment recipient.

Electronic payment system 104 may be configured to perform any suitable operations to release the funds for the electronic payment to the designated recipient and/or to facilitate collection of the payment by the recipient. For example, electronic payment system 104 may be configured to notify the recipient that the funds of the payment are available for collection by the recipient. In certain examples, electronic payment system 104 and/or one or more computing systems communicatively coupled to electronic payment system 104 may be configured to perform one or more of the operations described in pending U.S. patent application Ser. No. 15/995,026, filed May 31, 2018, and titled ATM-Based Electronic Payment Conversion Systems, Methods, and User Interface, the content of which is hereby incorporated by reference in its entirety, which may facilitate collection of the payment by the recipient by way of an ATM.

Payment funding system 102 may provide one or more services to ATM 106 to facilitate funding of a pending electronic payment by way of ATM 106. The services may be accessible by an appropriately configured ATM 106 and may constitute an interface between ATM 106 and payment funding system 102.

As an example, ATM interface 904 may include a set of web services 908 configured to provide an interface between ATM 106 and payment funding system 102. In certain examples, web services 908 may be accessed and used by ATM 106 to interface with payment funding system 102. To this end, ATM 106 may be configured with computing code (e.g., computing instructions implemented by ATM 106 as software, firmware, and/or other suitable form of computer-executable instructions) configured to direct ATM 106 to interact with web services 908 to perform or initiate one or more of the operations of ATM 106 and/or payment funding system 102 described herein.

The web services may be implemented in any suitable way and using any suitable protocols. The web services may be provided in any suitable form, including software as a service (SaaS), platform as a service (PaaS), etc.

The web services may be implemented using any suitable messaging protocol. For example, the web services may be implemented using a Simple Object Access Protocol (SOAP). This may be referred to as a web service SOAP implementation, which may be configured to use standard, modified, and/or augmented SOAP request and response messages.

In certain examples, a SOAP request message may include a SOAP envelope divided into a header section and a body section. The header section of the SOAP request message may include any data configured to secure payment processing and/or to control message routing. For example, the header section may include a subsection containing addressing information such as an agent identifier and an originator's Internet Protocol (IP) address. The originator's IP address may be matched with an address or range of addresses corresponding to the originator, previously defined as a valid IP address for the agent. Accordingly, only requests from the agent will be valid to access the services. In addition, the header section may include a subsection containing security information, such as credentials for authentication to payment funding system 102 and/or electronic payment system 104 (e.g., user domain, user identifier, user password, session identifier, etc.).

A SOAP response message may include parameters such as an operation code (e.g., authentication fault codes, error fault codes, security errors, etc.), an error parameter, and a process date and time.

Examples of services that may be provided by payment funding system 102 and used by ATM 106 include, without limitation, a login operation service, a logout operation service, a validate user session service, a transaction query service configured to access a transaction query API, and a funding outcome service configured to access a funding outcome API. Such services may provide an interface between ATM 106 and payment funding system 102.

Use of services such as web services 908 provides an architecture that may facilitate decoupling of operations of electronic payment system 104 and operations of ATM 106 in a manner that allows electronic payment system 104 to modify services of electronic payment system 104 (e.g., adding a new service) without requiring modification of payment funding system 102 and/or ATM 106.

Payment funding system 102 and/or components of payment funding system 102 may be implemented in any suitable way relative to ATM 106 and electronic payment system 104. As an example, payment funding system 102 may be implemented separately from and communicatively coupled to ATM 106 and electronic payment system 104, such as by implementing payment funding system 102 with one or more physical computing devices (e.g., a web server, a router, etc.) in a computing domain that is separate from ATM 106 and electronic payment system 104 and their respective computing domains. In such an example, payment funding system 102 may be configured to communicate with electronic payment system 104 and ATM 106 in any suitable way, including by way of one or more communication networks. As another example, payment funding system 102 or one or more components of payment funding system 102 may be implemented within ATM 106 and/or electronic payment system 104, such as within ATM 106 (e.g., as computing code installed in and executable by ATM 106), a computing domain of ATM 106, electronic payment system 104 (e.g., as computing code installed in and executable by electronic payment system 104), and/or a computing domain of electronic payment system 104.

Figure 10:
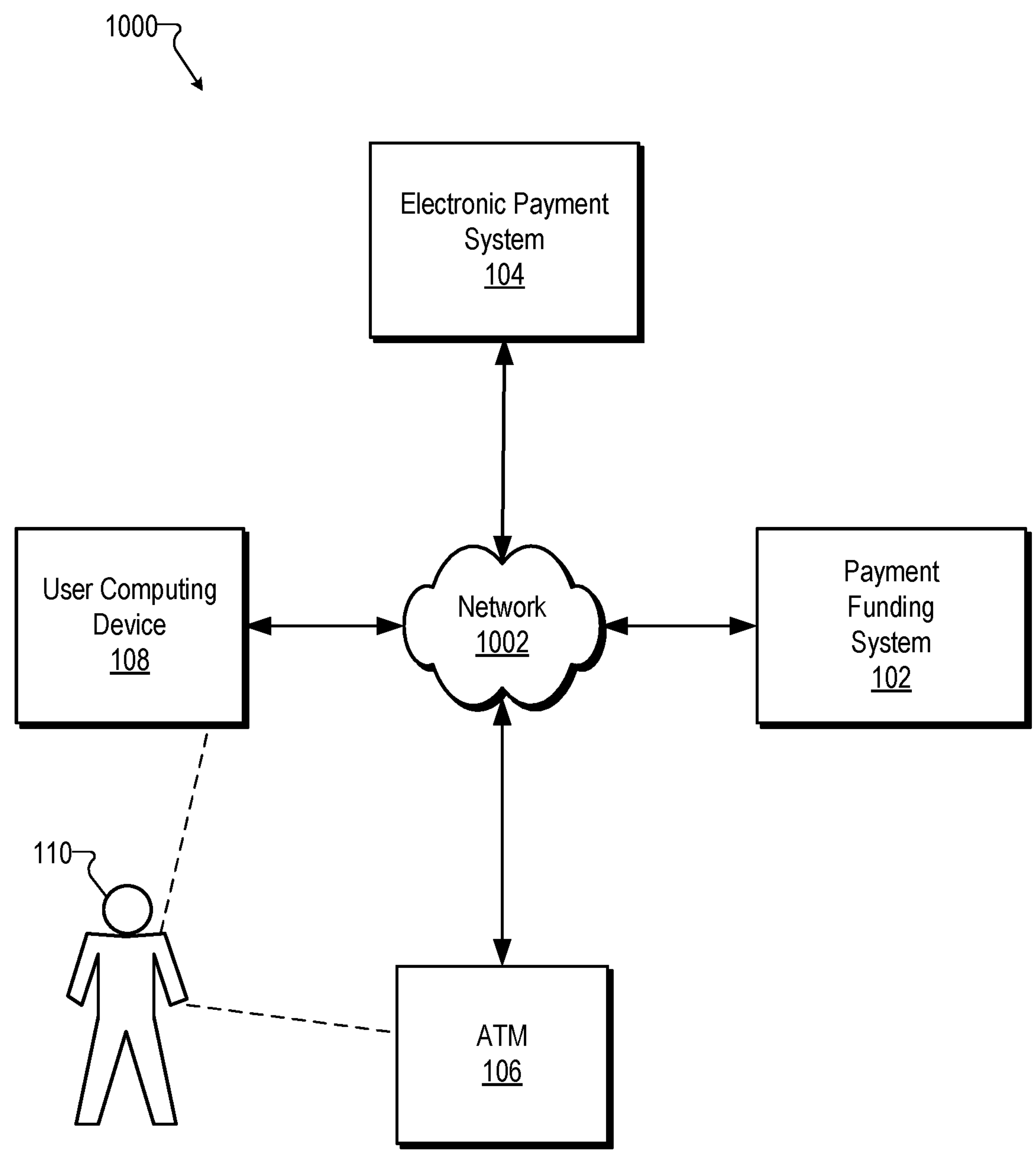
FIG. 10 illustrates another exemplary configuration in which an ATM-based electronic payment funding system is implemented according to principles described herein.

FIG. 10 illustrates an exemplary configuration 1000 in which an ATM-based electronic payment funding system is implemented. As shown, configuration 1000 includes payment funding system 102, electronic payment system 104, ATM 106, and user computing device 108 communicatively coupled to a network 1002. Payment funding system 102 may be configured to communicate with electronic payment system 104, ATM 106, and user computing device 108 over network 1002 using any suitable communication technologies (e.g., network connections). While payment funding system 102 is shown to be separate from and communicatively coupled to electronic payment system 104 and ATM 106 in FIG. 10, one or more components of payment funding system 102 may be integrated within electronic payment system 104 and/or ATM 106 in other configurations.

Network 1002 may include a wired or wireless network (e.g., a cable or satellite carrier network or a mobile telephone network), the Internet, a wide area network, a local area network, or any other suitable communications network or combination of communication networks. Data may be transmitted and received over network 1002 (e.g., by way of one or more network connections) using any suitable data communication technologies, devices, media, and protocols.

Figure 11:
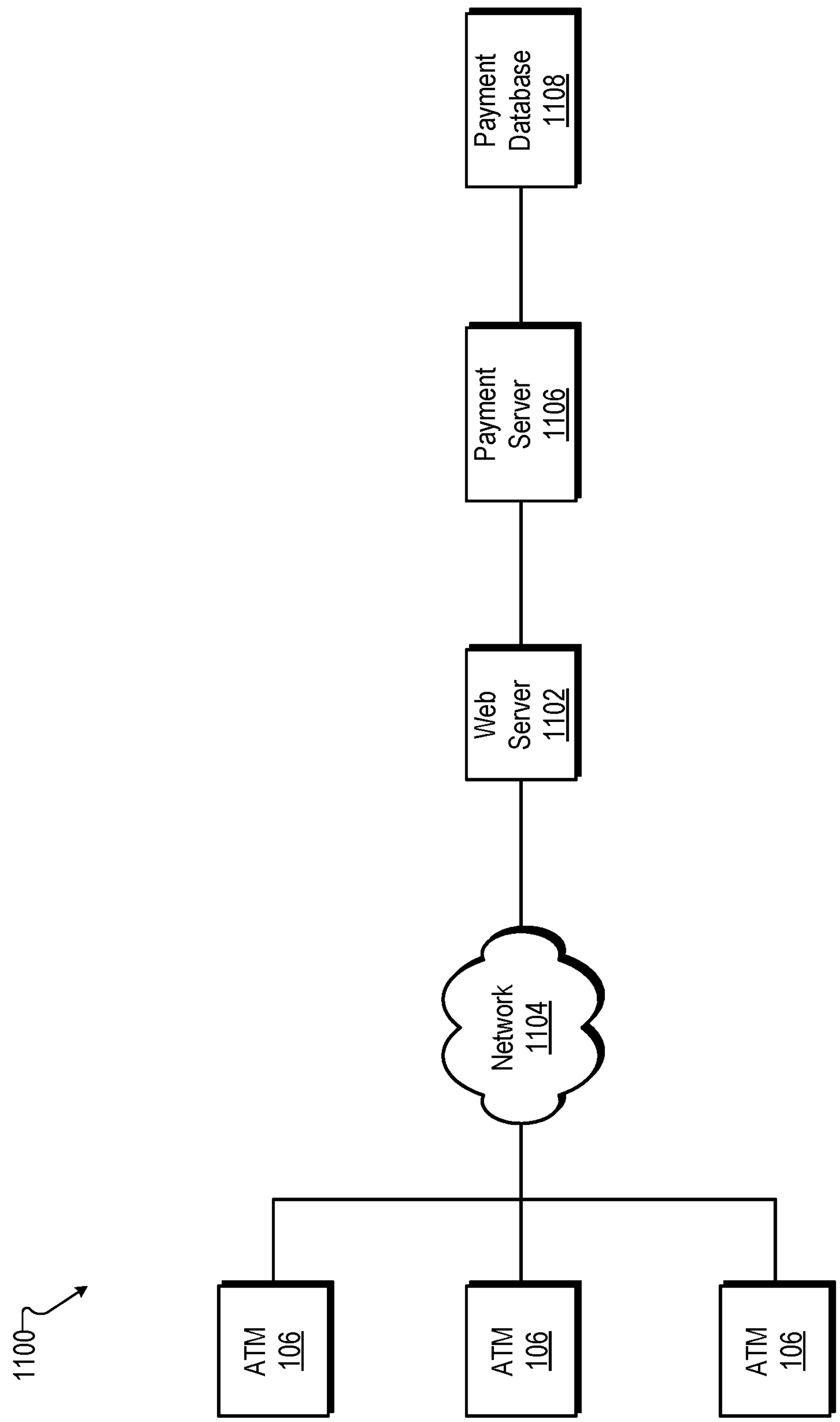
FIG. 11 illustrates another exemplary configuration in which an ATM-based electronic payment funding system is implemented according to principles described herein.

FIG. 11 illustrates another exemplary configuration 1100 in which an ATM-based electronic payment funding system is implemented. As shown, configuration 1100 includes a set of ATMs 106 communicatively coupled to a web server 1102 by way of a network 1104. Web server 1102 is communicatively coupled to a payment server 1106, which is communicatively coupled to a payment database 1108. In configuration 1100, electronic payment system 104 may include or be implemented by payment server 1106 (e.g., as one or more application servers) and payment database 1108. Accordingly, payment server 1106 and payment database 1108 may be configured to perform one or more operations of electronic payment system 104 described herein. Payment funding system 102 or one or more components of payment funding system 102 may be implemented by ATMs 106, web server 1102, and/or payment server 1106 as may suit a particular implementation.

Web server 1102 may be configured to perform routing operations for routing communications, services, and/or messages between ATMs 106 and payment server 1106. In certain examples, web server 1102 may be configured to provide a set of services to ATMs 106, such as web services 908.

Network 1104 may include a wired or wireless network (e.g., a cable or satellite carrier network or a mobile telephone network), the Internet, a wide area network, a local area network, or any other suitable communications network or combination of communication networks. Data may be transmitted and received over network 1104 (e.g., by way of one or more network connections) using any suitable data communication technologies, devices, media, and protocols.

Any of the systems and/or configurations of systems described herein may implement and/or be configured to use any suitable security technologies to secure communications, data, and/or operations. Examples of such security technologies may include, without limitation, cryptography (e.g., encryption using secure socket layer (SSL)), digital signature, authentication, authorization, firewall, secure protocol, and secure communication link technologies.

In certain examples, payment funding system 102 (e.g., web server 1102 implementing one or more components of payment funding system 102) may be configured to provide channel authentication to secure communications between ATM 106 and payment funding system 102. Such channel authentication may be based on any suitable credentials provided by ATM 106, such as a user name, a user password, and a user domain.

In addition, electronic payment system 104 (e.g., payment server 1106 implementing one or more components of electronic payment system 104) may be configured to provide application authentication to authenticate ATM 106 to electronic payment system 104 and/or to validate application user credentials, which are different from the credentials used for channel authentication. Once application authentication is verified, electronic payment system 104 may provide a session identifier to payment funding system 102 and/or ATM 106 for use in transmissions associated with the session with electronic payment system 104.

Payment funding system 102 and/or electronic payment system 104 may be further configured to perform one or more authorization operations. For example, payment funding system 102 (e.g., web server 1102 implementing one or more components of payment funding system 102) may be configured to validate that an agent (e.g., a client of web services 908 that is executing on ATM 106) is authorized to invoke a requested service or operation. As another example, electronic payment system 104 (e.g., payment server 1106 implementing one or more components of electronic payment system 104) may be configured to validate that user 110 of ATM 106 is authorized to modify or query the requested electronic payment data.

Figure 12:
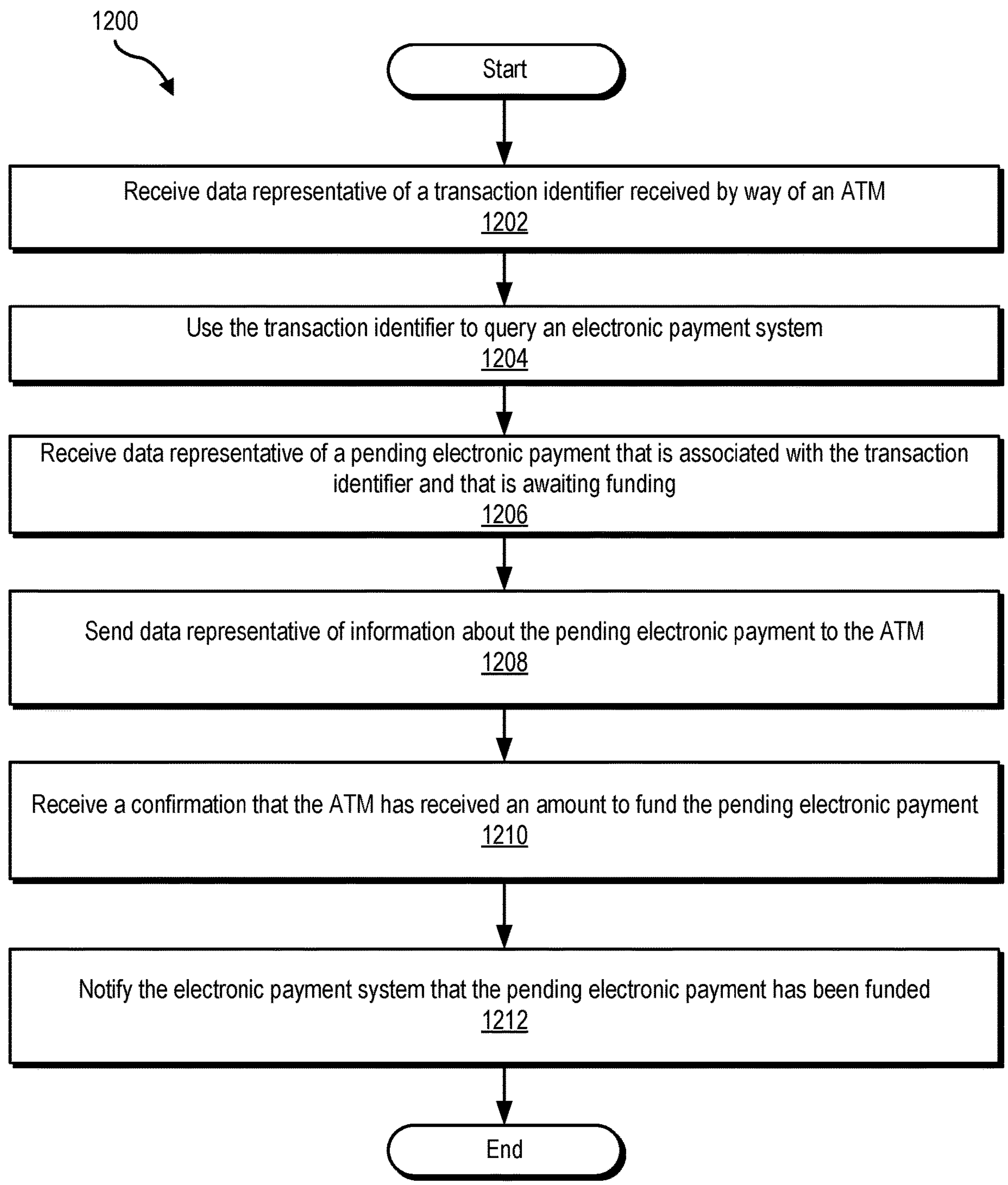
FIG. 12 illustrates an exemplary ATM-based electronic payment funding method according to principles described herein.

FIG. 12 illustrates an exemplary ATM-based electronic payment funding method 1200. While FIG. 12 illustrates exemplary operations according to one embodiment, other embodiments may omit, add to, reorder, and/or modify any of the operations shown in FIG. 12. One or more of the operations shown in FIG. 12 may be performed by a computer-implemented system, such as a payment funding system (e.g., payment funding system 102) and/or any implementation thereof.

In operation 1202, a payment funding system receives data representative of a transaction identifier received by way of an ATM. Operation 1202 may be performed in any of the ways described herein.

In operation 1204, the payment funding system uses the transaction identifier to query an electronic payment system. Operation 1204 may be performed in any of the ways described herein.

In operation 1206, the payment funding system receives data representative of a pending electronic payment that is associated with the transaction identifier and that is awaiting funding. Operation 1206 may be performed in any of the ways described herein.

In operation 1208, the payment funding system sends data representative of information about the pending electronic payment to the ATM, the information indicating an amount to fund the pending electronic payment. Operation 1208 may be performed in any of the ways described herein.

In operation 1210, the payment funding system receives a confirmation that the ATM has received the amount to fund the pending electronic payment. Operation 1210 may be performed in any of the ways described herein.

In operation 1212, the payment funding system notifies the electronic payment system that the pending electronic payment has been funded. Operation 1212 may be performed in any of the ways described herein.

Figure 13:
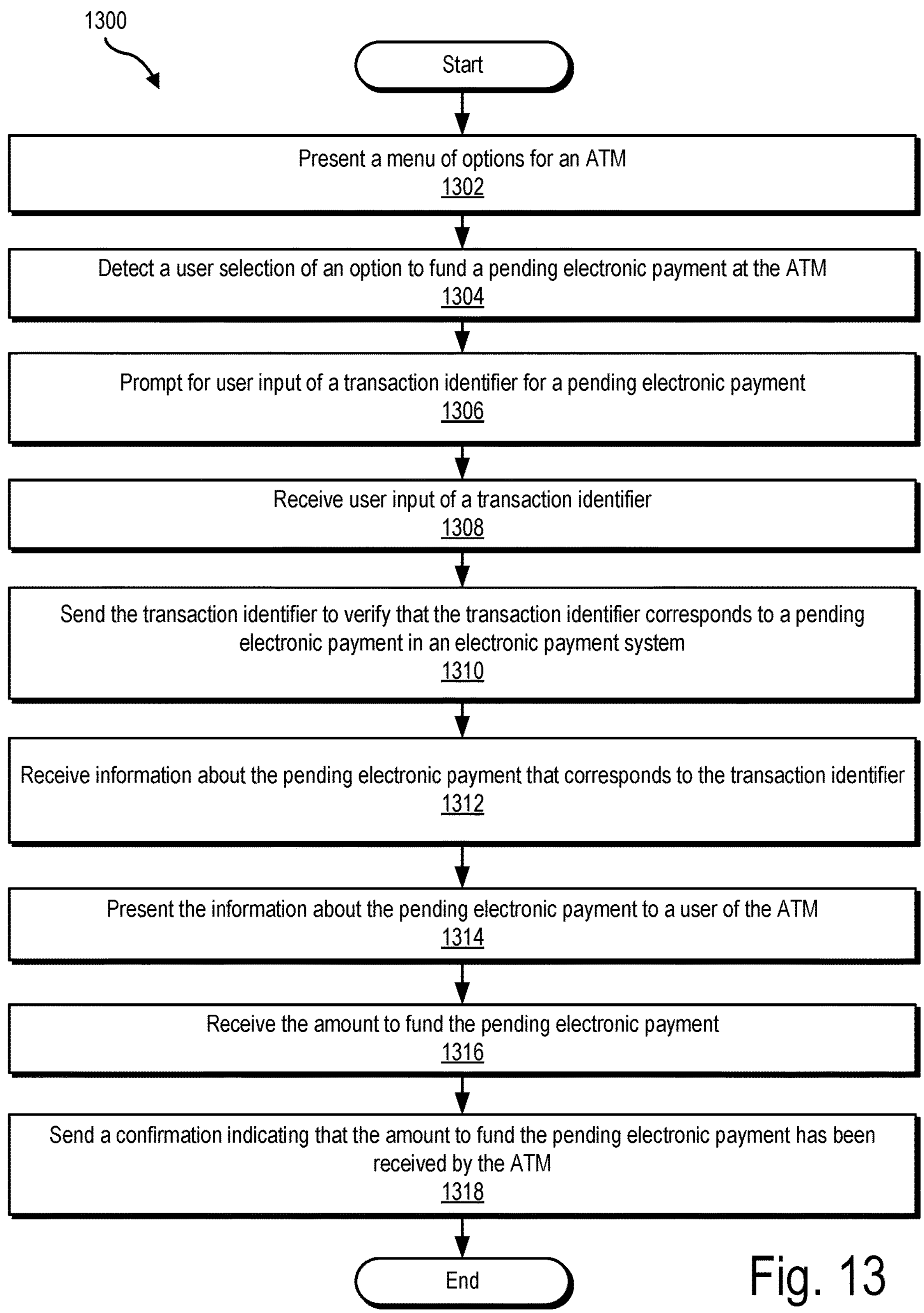
FIG. 13 illustrates another exemplary ATM-based electronic payment funding method according to principles described herein.

FIG. 13 illustrates an exemplary ATM-based electronic payment funding method 1300. While FIG. 13 illustrates exemplary operations according to one embodiment, other embodiments may omit, add to, reorder, and/or modify any of the operations shown in FIG. 13. One or more of the operations shown in FIG. 13 may be performed by a computer-implemented system, such as an ATM (e.g., ATM 106) and/or any implementation thereof.

In operation 1302, an ATM presents a menu of options for the ATM. Operation 1302 may be performed in any of the ways described herein.

In operation 1304, the ATM detects a user selection of an option to fund a pending electronic payment at the ATM. Operation 1304 may be performed in any of the ways described herein.

In operation 1306, the ATM prompts for user input of a transaction identifier for a pending electronic payment. Operation 1306 may be performed in any of the ways described herein.

In operation 1308, the ATM receives user input of a transaction identifier. Operation 1308 may be performed in any of the ways described herein.

In operation 1310, the ATM sends data representative of the transaction identifier to a payment funding system for use by the payment funding system to verify that the transaction identifier corresponds to a pending electronic payment in an electronic payment system. Operation 1310 may be performed in any of the ways described herein.

In operation 1312, the ATM receives data representative of information about the pending electronic payment that corresponds to the transaction identifier. The information indicates an amount to fund the pending electronic payment. Operation 1312 may be performed in any of the ways described herein.

In operation 1314, the ATM presents the information about the pending electronic payment to a user of the ATM. In certain examples, the ATM may also provide a menu of payment options each selectable by a user of the ATM to indicate how the user will fund the pending electronic payment by way of the ATM, detects a user selection of one of the options, and prompts the user to fund the electronic payment with the selected option. Operation 1314 may be performed in any of the ways described herein.

In operation 1316, the ATM receives the amount to fund the pending electronic payment. Operation 1316 may be performed in any of the ways described herein.

In operation 1318, the ATM sends, to the payment funding system, a confirmation indicating that the amount to fund the pending electronic payment has been received by the ATM. Operation 1318 may be performed in any of the ways described herein.

Figure 14:
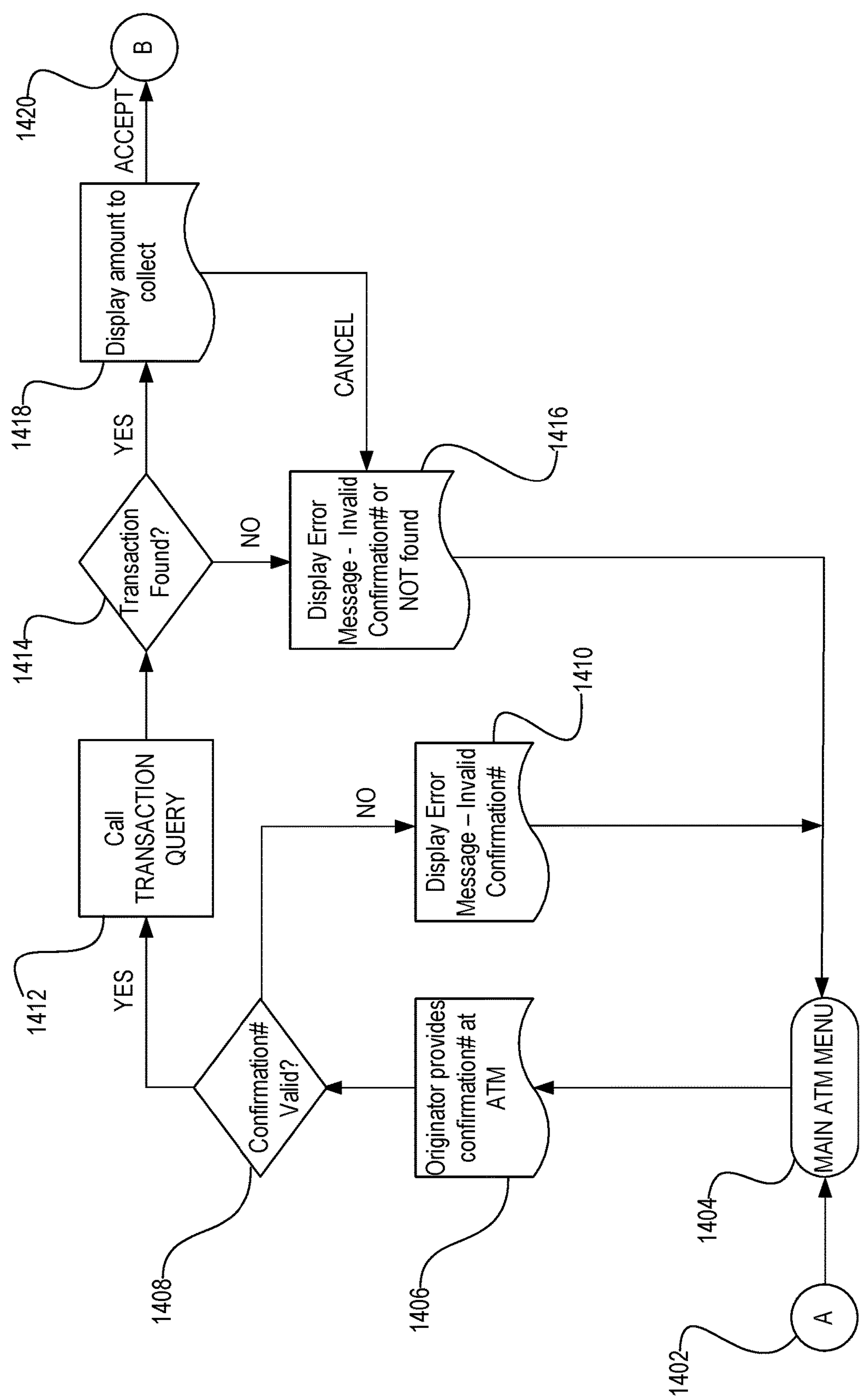
FIGS. 14-15 illustrate another exemplary ATM-based electronic payment funding method according to principles described herein.
Figure 15:
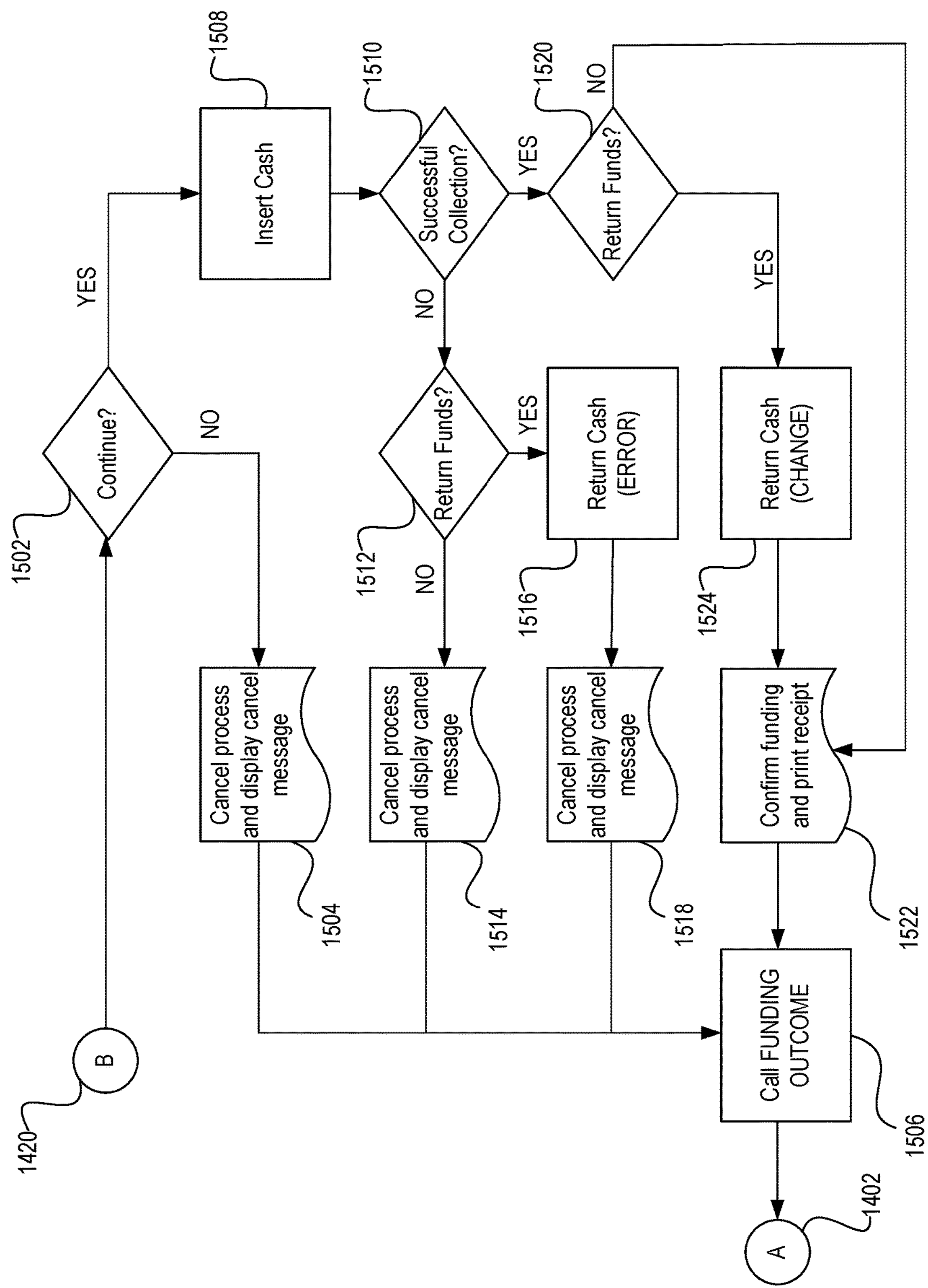

FIGS. 14-15 illustrate an exemplary ATM-based electronic payment funding method. While FIGS. 14-15 illustrate exemplary operations according to one embodiment, other embodiments may omit, add to, reorder, and/or modify any of the operations shown in FIGS. 14-15. Operations shown in FIGS. 14-15 may be performed by components of configuration 100, such as by ATM 106 and/or components of payment funding system 102 that are implemented by ATM 106.

Turning to FIG. 14, a circle 1402 labeled "A" represents a starting point that precedes or includes ATM 106 displaying a main ATM menu at operation 1404. At operation 1406, ATM 106 receives a transaction identifier in the form of a confirmation number.

At operation 1408, ATM 106 determines whether the received confirmation number is valid, such as by determining that the confirmation number includes an appropriate quantity of numbers and/or other characters (e.g., that the entered confirmation number includes an 11-digit number). If ATM 106 determines that the received confirmation number is not valid, ATM 106 performs operation 1410 by displaying an error message indicating an invalid confirmation number and returns to displaying the main ATM menu at operation 1404. If ATM 106 determines that the received confirmation number is valid, ATM 106 performs operation 1412 by calling a transaction query function (e.g., the transaction query API described herein) to inquire with a backend system (e.g., electronic payment system 104) about the status of a transaction associated with the confirmation number.

At operation 1414, ATM 106 determines the status of the transaction associated with the confirmation number based on a response to the transaction query. If no matching transaction is found, ATM 106 performs operation 1416 by displaying an error message indicating an invalid or unfound confirmation number and returns to starting point "A" 1402 and displays the main ATM menu at operation 1404. If a valid, matching transaction is found, ATM 106 performs operation 1418 by displaying an amount to fund the matching transaction.

In certain examples, at operation 1414, ATM 106 may determine the status of the transaction associated with the confirmation number by determining whether a matching transaction is found and whether a found matching transaction is available for funding. This may include determining whether a found matching transaction has a "pending" or "awaiting funding" status.

At operation 1418, if the user of ATM 106 elects to cancel the funding, ATM 106 performs operation 1416 by displaying an error message indicating an invalid or unfound confirmation number and returns to starting point "A" 1402 and displays the main ATM menu at operation 1404. On the other hand, if the user of ATM 106 elects not to cancel and/or elects to accept the displayed amount, ATM 106 performs operation 1502 shown in FIG. 15. The transition from operation 1418 of FIG. 14 to operation 1502 of FIG. 15 is illustrated by circle 1420 labeled "B" in FIG. 14 and FIG. 15.

In operation 1502, ATM 106 determines whether the user of ATM 106 wants to continue with funding the transaction. If the user does not want to continue, at operation 1504 ATM 106 cancels the process and displays a cancel message.

ATM 106 then performs operation 1506 by calling a funding outcome function (e.g., the funding outcome API described herein) to provide data representative of the outcome of the funding process to the backend system (e.g., electronic payment system 104). ATM 106 then returns to starting point "A" 1402 and displays the main ATM menu at operation 1404.

Returning to operation 1502, if the user wants to continue the funding process, at operation 1508 ATM 106 collects payment such as by receiving cash inserted into ATM 106 by the user of ATM 106.

At operation 1510, ATM 106 determines whether the collection is successful. If the collection is unsuccessful, at operation 1512 ATM 106 determines whether to return collected funds to the user of ATM 106. If there are no funds to be returned, at operation 1514 ATM 106 cancels the process and displays a cancel message.

ATM 106 then performs operation 1506 by calling the funding outcome function (e.g., the funding outcome API described herein) to provide data representative of the outcome of the funding process to the backend system (e.g., electronic payment system 104). ATM 106 then returns to starting point "A" 1402 and displays the main ATM menu at operation 1404.

Returning to operation 1512, If there are funds to be returned, at operation 1516 ATM 106 returns funds due to an error with collection of the funds, such as by returning cash that was received at operation 1508. At operation 1518, ATM 106 then cancels the process and displays a cancel message.

ATM 106 then performs operation 1506 by calling the funding outcome function (e.g., the funding outcome API described herein) to provide data representative of the outcome of the funding process to the backend system (e.g., electronic payment system 104). ATM 106 then returns to starting point "A" 1402 and displays the main ATM menu at operation 1404.

Returning to operation 1510, if the collection is successful, at operation 1520 ATM 106 determines whether to return collected funds to the user of ATM 106. If there are no funds to be returned, at operation 1522 ATM 106 confirms funding and prints a receipt.

ATM 106 then performs operation 1506 by calling the funding outcome function (e.g., the funding outcome API described herein) to provide data representative of the outcome of the funding process to the backend system (e.g., electronic payment system 104). ATM 106 then returns to starting point "A" 1402 and displays the main ATM menu at operation 1404.

Returning to operation 1520, If there are funds to be returned, at operation 1524 ATM 106 returns funds due to overpayment (i.e., provides change), such as by returning excess cash that was received at operation 1508. At operation 1522, ATM 106 then confirms funding and prints a receipt.

ATM 106 then performs operation 1506 by calling the funding outcome function (e.g., the funding outcome API described herein) to provide data representative of the outcome of the funding process to the backend system (e.g., electronic payment system 104). ATM 106 then returns to starting point "A" 1402 and displays the main ATM menu at operation 1404.

Any of payment funding system 102, ATM 106, and/or electronic payment system 104 may include or be implemented by at least one physical computing device and may perform the various operations described herein by directing one or more components of the physical computing device to perform the operations. Accordingly, operations described herein as being performed by payment funding system 102, ATM 106, or electronic payment system 104 may be performed, in certain implementations, by payment funding system 102, ATM 106, or electronic payment system 104 directing one or more components of the physical computing device to perform the operations. Such operations may also be referred to as being performed by the physical computing device and/or a computer-implemented system.

Figure 16:
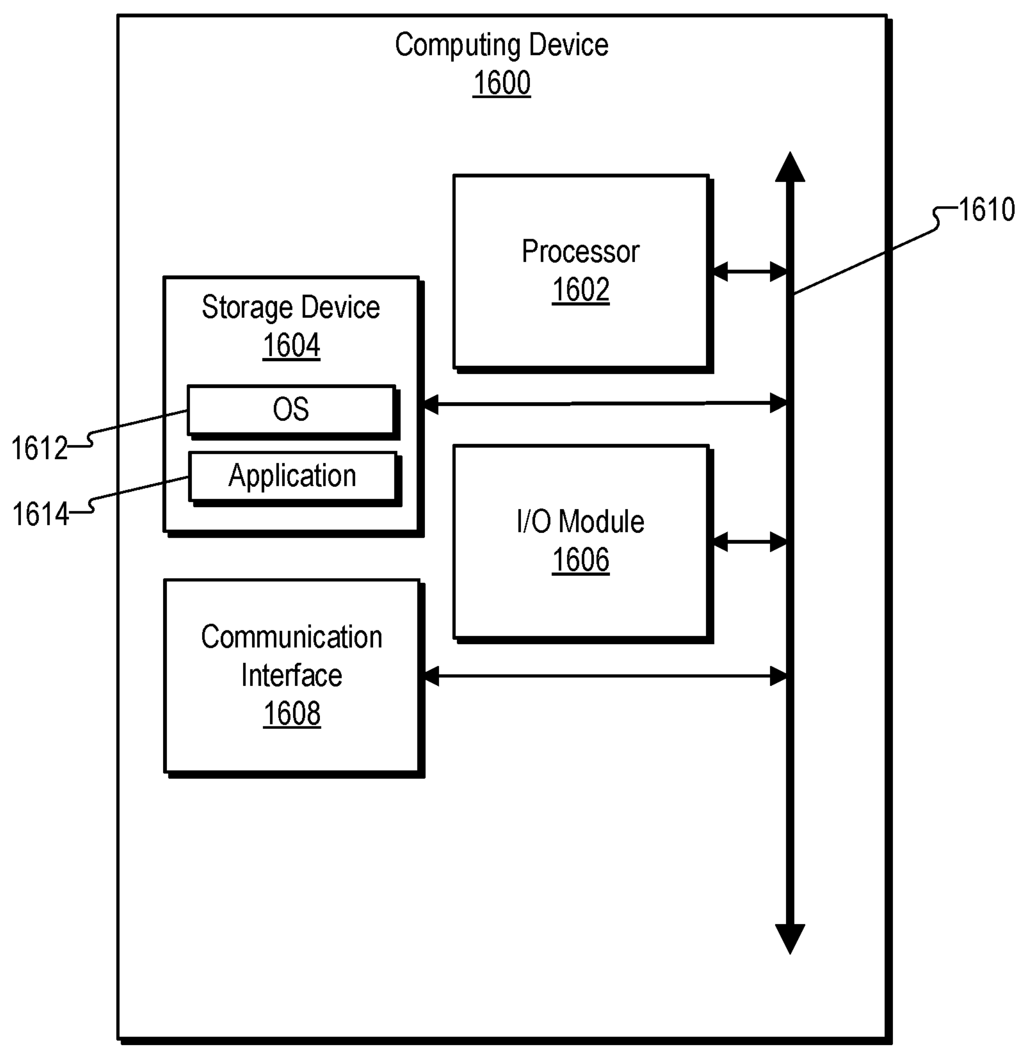
FIG. 16 illustrates an exemplary computing device according to principles described herein.

FIG. 16 illustrates an exemplary physical computing device 1600 ("computing device 1600") specifically configured to perform one or more of the operations described herein. As shown in FIG. 16, computing device 1600 may include a processor 1602, a storage device 1604, an input/output ("I/O") module 1606, and a communication interface 1608 communicatively connected to one another via a communication infrastructure 1610. While an exemplary computing device 1600 is shown in FIG. 16, the components illustrated in FIG. 16 are not intended to be limiting. Additional or alternative components may be used in other embodiments.

Processor 1602 generally represents any type or form of physical processing unit capable of processing data or interpreting, executing, and/or directing execution of one or more of the instructions, processes, and/or operations described herein. Processor 1602 may direct execution of operations in accordance with an operating system ("OS") 1612 and one or more applications, such as an application 1614, or other computer-executable instructions stored in storage device 1604 or another computer-readable medium.

Storage device 1604 may include one or more data storage media (e.g., a non-transitory computer-readable medium), devices, or configurations and may employ any type, form, and combination of data storage media and/or devices. For example, storage device 1604 may include, but is not limited to, a hard drive, network drive, flash drive, magnetic disc, optical disc, RAM, dynamic RAM, solid-state drive, other non-volatile and/or volatile data storage units, or a combination or sub-combination thereof. Electronic data, including data described herein, may be temporarily and/or permanently stored in storage device 1604. In some examples, data may be arranged in one or more databases residing within storage device 1604.

In certain embodiments, one or more components of payment funding system 102, ATM 106, and/or electronic payment system 104 may be implemented as application 1614 installed on computing device 1600. Data representative of installed executable application 1614 may be stored within storage device 1604 and configured to direct processor 1602 (and thus any of the components of computing device 1600) to perform one or more of the operations described herein.

I/O module 1606 may include one or more I/O modules configured to receive user input and provide user output. One or more I/O modules may be used to receive input by way of a user interface provided by computing device 1600. I/O module 1606 may include any hardware, firmware, software, or combination thereof supportive of input and output capabilities. For example, I/O module 1606 may include hardware and/or software for capturing user input, including, but not limited to, a keyboard or keypad, a touchscreen component (e.g., a touchscreen display), a receiver (e.g., an RF or infrared receiver), motion sensors, a microphone, and/or one or more input buttons.

I/O module 1606 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation on a display screen (e.g., to user computing device 108 for display on a display screen of user computing device 108). The graphical data may be representative of one or more graphical user interfaces and/or any other graphical content as may serve a particular implementation, including content of any of the exemplary graphical user interface views described herein.

Communication interface 1608 may be configured to communicate with one or more other computing devices separate from computing device 1600. Examples of communication interface 1608 include, without limitation, a wired network interface (such as a network interface card), a wireless network interface (such as a wireless network interface card), a modem, an audio/video connection, a radio frequency transceiver, and any other suitable interface.

For a distributed architecture in which components of payment funding system 102 are distributed across an ATM and a backend computing system, physical computing device 1600 may represent the ATM or a backend physical computing device. In examples in which computing device 1600 represents a backend computing device, application 1614 may include backend components of payment funding system 102. In examples in which computing device 1600 represents an ATM, application 1614 may include ATM-based components of payment funding system 102, and I/O module 1606 may include ATM input and output mechanism such as a physical currency dispenser/collector, a keypad, menu buttons, display screen, etc. of an ATM.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

at least one physical computing device that is communicatively coupled, by way of a network, to an automated teller machine (ATM) that includes at least one of a physical currency payment acceptor or a card payment acceptor, the at least one physical computing device:

receives, from the ATM, data representative of a transaction identifier received by way of user input at the ATM;

uses the transaction identifier to query an electronic payment system;

receives, from the electronic payment system in response to the query, data representative of a pending electronic payment that is associated with the transaction identifier and that is awaiting funding, the data including instructions to fund an amount of the pending electronic payment to an account of a third party that is not registered with the electronic payment system;

sends, to the ATM, data representative of information about the pending electronic payment, the information indicating the amount to fund the pending electronic payment;

receives, from the ATM, a confirmation that the ATM has received the amount to fund the pending electronic payment by way of at least one of a user inserting physical currency into the physical currency payment acceptor of the ATM or the user providing a card with respect to the card payment acceptor of the ATM to provide the amount from an account of the user; and notifies the electronic payment system that the pending electronic payment has been funded to the account of the third party, wherein the user that provides the amount by way of the ATM to fund the pending electronic payment has not registered banking information or payment card information with the electronic payment system.

2. The system of claim 1, wherein the at least one physical computing device uses the transaction identifier to query the electronic payment system by calling a transaction query application program interface to initiate a query of a transaction database of the electronic payment system.

3. The system of claim 1, wherein the at least one physical computing device notifies the electronic payment system that the pending electronic payment has been funded by calling a funding outcome application program interface to notify the electronic payment system of a funding outcome at the ATM.

4. The system of claim 1, wherein:

the at least one physical computing device comprises at least one web server configured to provide web services, by way of the network, to the ATM; and through the web services the at least one physical computing device receives, from the ATM, a request message that includes the data representative of the transaction identifier, sends, to the ATM, a response message that includes the data representative of the information about the pending electronic payment, and receives, from the ATM, the confirmation that the ATM has received the amount to fund the pending electronic payment.

5. The system of claim 1, wherein the information indicating the amount to fund the pending electronic payment indicates a transaction amount for the pending electronic payment and a service fee for the electronic payment system to process the pending electronic payment.

6. A system comprising:

an automated teller machine (ATM) that is communicatively coupled, by way of a network, to a payment funding system communicatively coupled to an electronic payment system, the ATM including at least one of a physical currency payment acceptor or a card payment acceptor, the ATM:

receives user input representative of a transaction identifier;

sends data representative of the transaction identifier to the payment funding system for use by the payment funding system to verify that the transaction identifier corresponds to a pending electronic payment that is in the electronic payment system and that includes instructions to fund an amount of the pending electronic payment to an account of a third party that is not registered with the electronic payment system;

receives, from the payment funding system, data representative of information about the pending electronic payment that corresponds to the transaction identifier, the information indicating the amount to fund the pending electronic payment;

presents the information about the pending electronic payment to a user of the ATM;

receives the amount to fund the pending electronic payment by way of at least one of the user inserting physical currency into the physical currency payment acceptor of the ATM or the user providing a card with respect to the card payment acceptor of the ATM to provide the amount from an account of the user; and sends, to the payment funding system, a confirmation indicating that the amount to fund the pending electronic payment has been received by the ATM, wherein the user that provides the amount by way of the ATM to fund the pending electronic payment has not registered banking information or payment card information with the electronic payment system.

7. The system of claim 6, wherein:

the ATM presents a menu of options, each option in the menu of options selectable by the user of the ATM to access a respective feature of the ATM; and the menu of options comprises an option to fund one or more pending electronic payments at the ATM.

8. The system of claim 7, wherein the ATM:

detects a user selection the option to fund one or more pending electronic payments at the ATM; and in response to the detected user selection, prompts for user input of one or more transaction identifiers for the one or more pending electronic payments.

9. The system of claim 6, wherein the payment funding system is configured to use the transaction identifier to query the electronic payment system by calling a transaction query application program interface to initiate a query of a transaction database of the electronic payment system.

10. The system of claim 6, wherein the payment funding system is configured to:

receive the confirmation indicating that the amount to fund the pending electronic payment has been received by the ATM; and notify, in response to the confirmation indicating that the amount to fund the pending electronic payment has been received by the ATM, the electronic payment system that the pending electronic payment has been funded by calling a funding outcome application program interface to notify the electronic payment system of a funding outcome at the ATM.

11. The system of claim 6, wherein:

the payment funding system comprises at least one web server configured to provide web services, by way of the network, to the ATM; and through the web services, the ATM sends a request message including the data representative of the transaction identifier to the payment funding system, receives, from the payment funding system, a response message including the data representative of the information about the pending electronic payment, and sends the confirmation that the ATM has received the amount to fund the pending electronic payment.

12. The system of claim 6, wherein the information indicating the amount to fund the pending electronic payment indicates a transaction amount for the pending electronic payment and a service fee for the electronic payment system to process the pending electronic payment.

13. The system of claim 6, wherein the ATM receives the amount to fund the pending electronic payment in physical currency.

14. The system of claim 6, wherein the ATM:

includes the physical currency payment acceptor;

provides a menu of payment options comprising an option to fund the pending electronic payment with physical currency;

detects a user selection of the option to fund the pending electronic payment with physical currency; and prompts the user to insert physical currency into the physical currency payment acceptor of the ATM to fund the pending electronic payment.

15. A method comprising:

receiving, by a computer-implemented system and from an automated teller machine (ATM), data representative of a transaction identifier received by way of user input at the ATM, the ATM including at least one of a physical currency payment acceptor or a card payment acceptor;

using, by the computer-implemented system, the transaction identifier to query an electronic payment system;

receiving, by the computer-implemented system and from the electronic payment system in response to the query, data representative of a pending electronic payment that is associated with the transaction identifier and that is awaiting funding, the data including instructions to fund an amount of the pending electronic payment to an account of a third party that is not registered with the electronic payment system;

sending, by the computer-implemented system and to the ATM, data representative of information about the pending electronic payment, the information indicating the amount to fund the pending electronic payment;

receiving, by the computer-implemented system and from the ATM, a confirmation that the ATM has received the amount to fund the pending electronic payment by way of at least one of a user inserting physical currency into the physical currency payment acceptor of the ATM or the user providing a card with respect to the card payment acceptor of the ATM to provide the amount from an account of the user; and notifying, by the computer-implemented system, the electronic payment system that the pending electronic payment has been funded to the third party, wherein the user that provides the amount by way of the ATM to fund the pending electronic payment has not registered banking information or payment card information with the electronic payment system.

16. The method of claim 15, wherein the using of the transaction identifier to query the electronic payment system comprises calling a transaction query application program interface to initiate a query of a transaction database of the electronic payment system.

17. The method of claim 15, wherein the notifying of the electronic payment system that the pending electronic payment has been funded comprises calling a funding outcome application program interface to notify the electronic payment system of a funding outcome at the ATM.

18. The method of claim 15, wherein:

the computer-implemented system comprises at least one web server that provides web services, by way of a network, to the ATM; and through the web services the computer-implemented system performs the receiving, from the ATM, of the data representative of the transaction identifier, the sending, to the ATM, of the data representative of the information about the pending electronic payment, and the receiving, from the ATM, of the confirmation that the ATM has received the amount to fund the pending electronic payment.

19. The method of claim 15, wherein the information indicating the amount to fund the pending electronic payment indicates a transaction amount for the pending electronic payment and a service fee for the electronic payment system to process the pending electronic payment.

20. The method of claim 15, embodied as computer-executable instructions on at least one non-transitory computer-readable medium.

* * * * *